United States Patent [19]

Carden

[11] Patent Number: 5,029,491

[45] Date of Patent: Jul. 9, 1991

[54] DIFFERENTIAL MECHANISMS

[75] Inventor: John C. Carden, Nassau, The Bahamas

[73] Assignee: Axial Wave Drive BV, Driebergen, Netherlands

[21] Appl. No.: 286,061

[22] PCT Filed: Mar. 21, 1988

[86] PCT No.: PCT/GB88/00217

§ 371 Date: Dec. 8, 1988

§ 102(e) Date: Dec. 8, 1988

[87] PCT Pub. No.: WO88/07148

PCT Pub. Date: Sep. 22, 1988

[30] Foreign Application Priority Data

| Mar. 19, 1987 | [GB] | United Kingdom | 8706546 |
| Apr. 13, 1987 | [GB] | United Kingdom | 8708771 |
| Jun. 30, 1987 | [GB] | United Kingdom | 8715287 |
| Oct. 9, 1987 | [GB] | United Kingdom | 8723741 |

[51] Int. Cl.⁵ .............................................. F16H 35/04
[52] U.S. Cl. ..................................................... 74/650
[58] Field of Search ................. 475/271, 283; 74/650, 74/665 R, 665 A, 665 K, 665 P

[56] References Cited

U.S. PATENT DOCUMENTS

| 1,283,283 | 10/1918 | Patch | 74/650 |
| 1,568,358 | 1/1926 | Welsh | 74/650 |
| 2,034,318 | 3/1936 | Wales | 74/650 |
| 2,220,432 | 11/1940 | Wales | 74/650 |
| 2,850,919 | 9/1958 | Wildhaber | 74/650 |

FOREIGN PATENT DOCUMENTS

| 741812 | 11/1944 | Fed. Rep. of Germany . |
| 1817553 | 7/1970 | Fed. Rep. of Germany . |
| 479242 | 12/1915 | France . |
| 117703 | 8/1918 | United Kingdom . |
| 537974 | 7/1941 | United Kingdom . |
| 636163 | 4/1950 | United Kingdom . |
| 694396 | 7/1953 | United Kingdom . |
| 752997 | 7/1956 | United Kingdom . |
| 881045 | 11/1961 | United Kingdom . |

OTHER PUBLICATIONS

Eureka Jan. 1988-Published by Innopress Limited "Shuffling Racks Control Unique diff", pp. 38-43.

Primary Examiner—Allan D. Herrmann
Assistant Examiner—Khoi Q. Ta
Attorney, Agent, or Firm—Beveridge, DeGrandi & Weilacher

[57] ABSTRACT

A differential mechanism for motor cars and other vehicles includes an input, two outputs, a face cam member connected to each of the outputs, and one or more cam followers. The face cam members are arranged co-axially and each has at least one axially directed helical cam surface portion. The helical cam surface portions are of opposite hand. The cam followers are slidably mounted for axial movement relative to said face cam members, and each of the cam followers include two axially spaced helical cam follower portions of opposite hands for mating abutment against the face cam surfaces. The arrangement is such that relative contra rotation of the outputs drives the cam followers to slide axially.

37 Claims, 17 Drawing Sheets

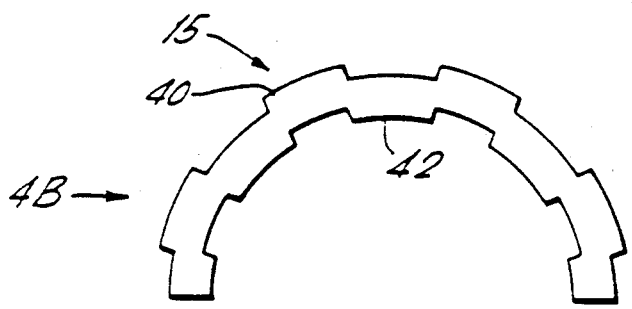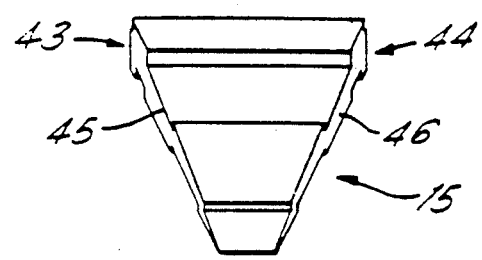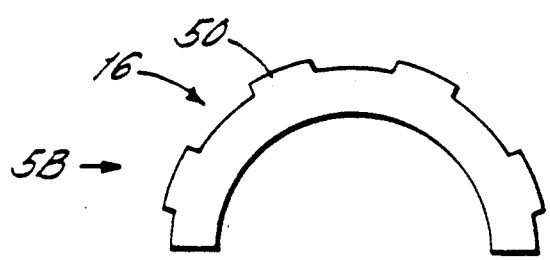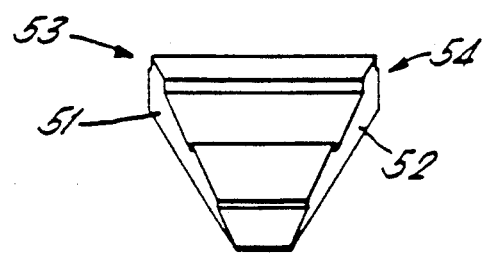

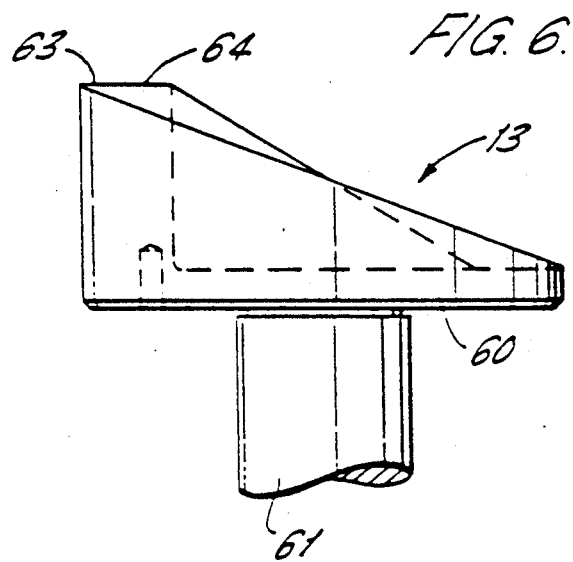
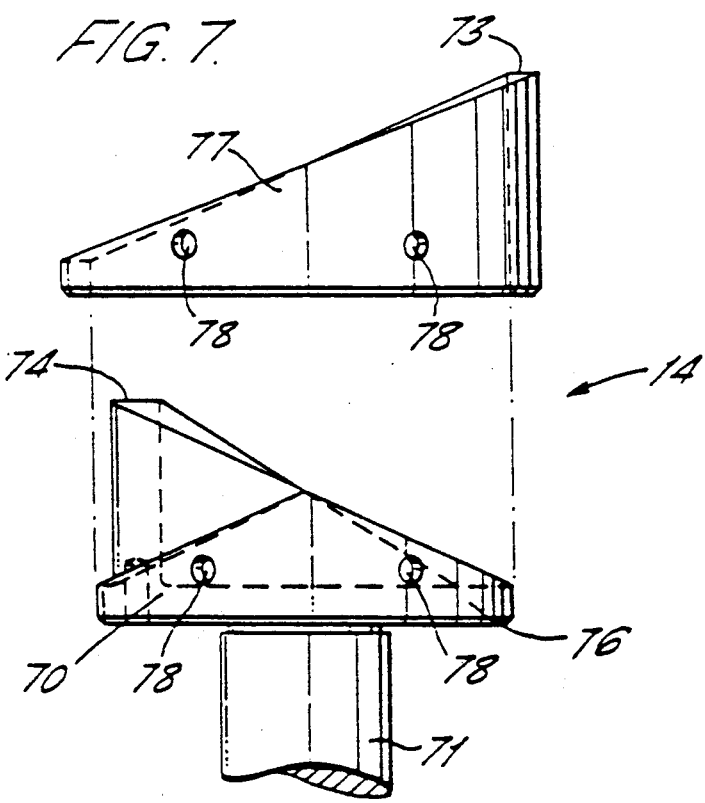

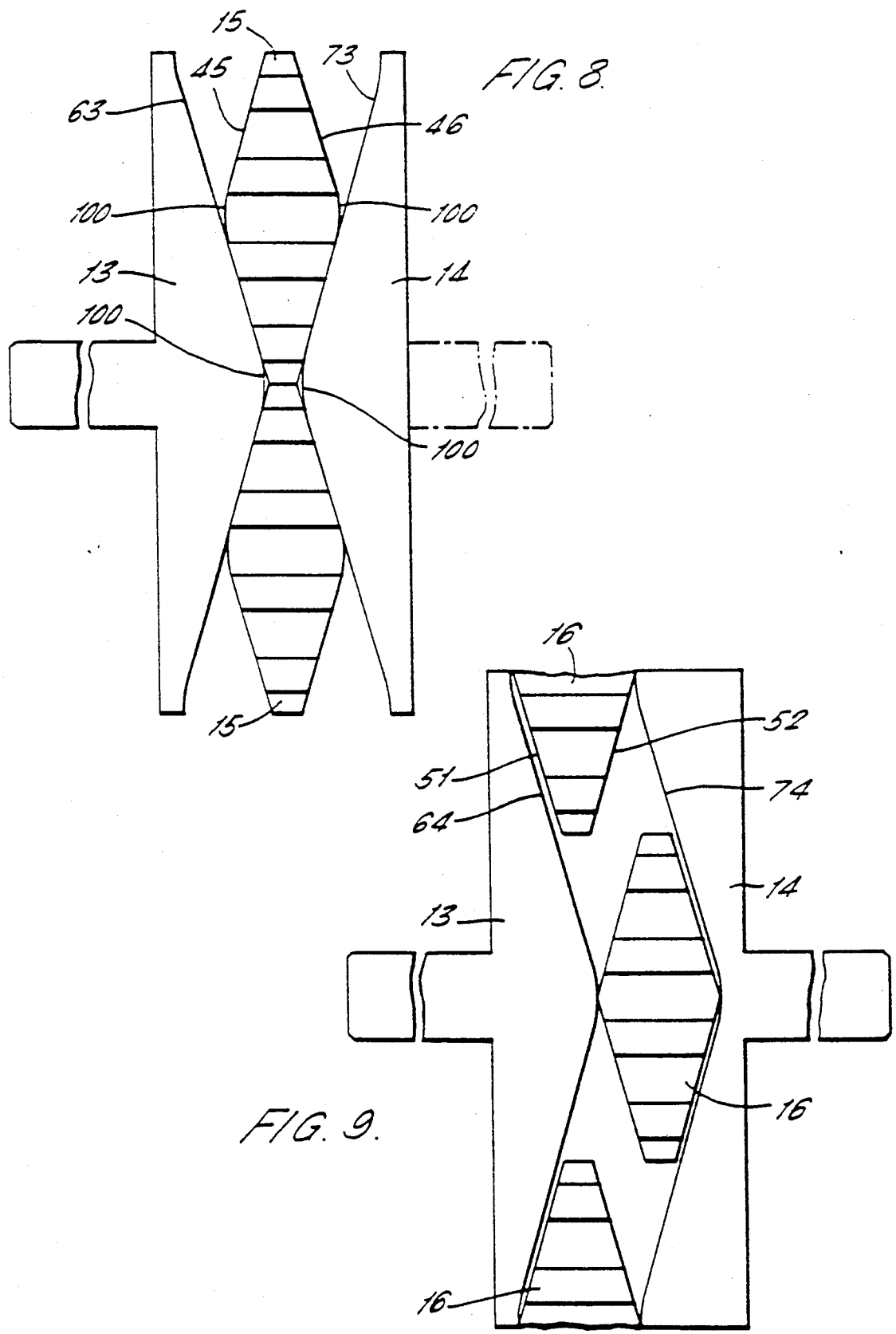

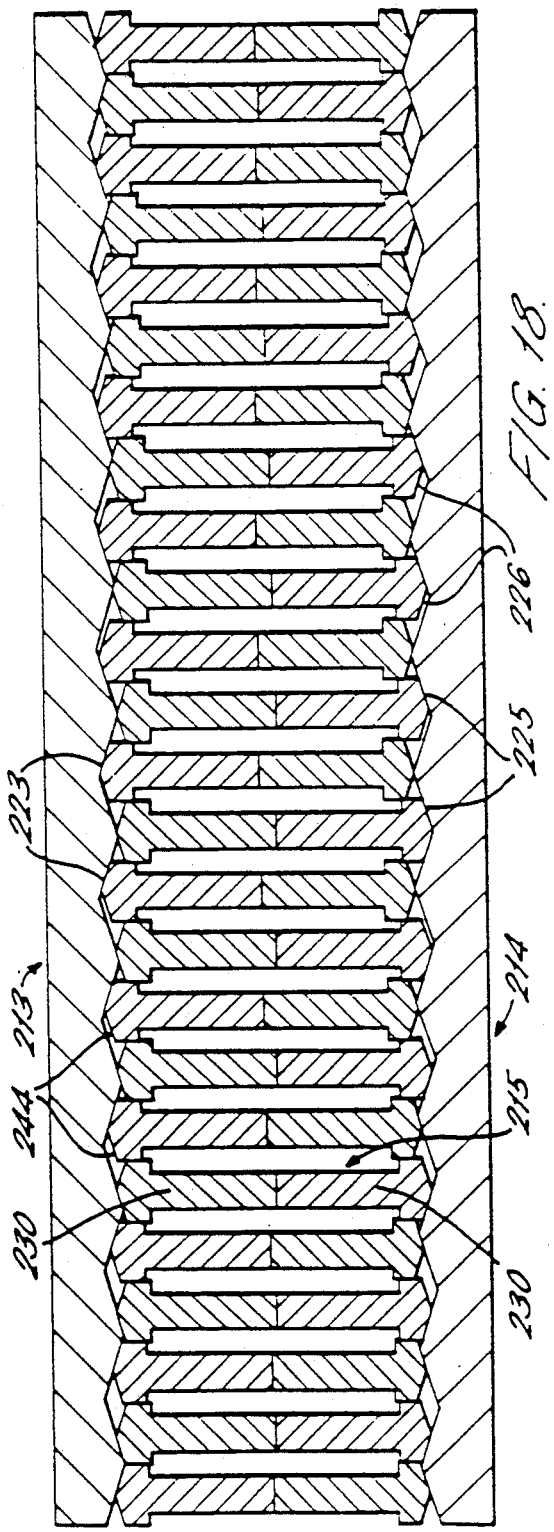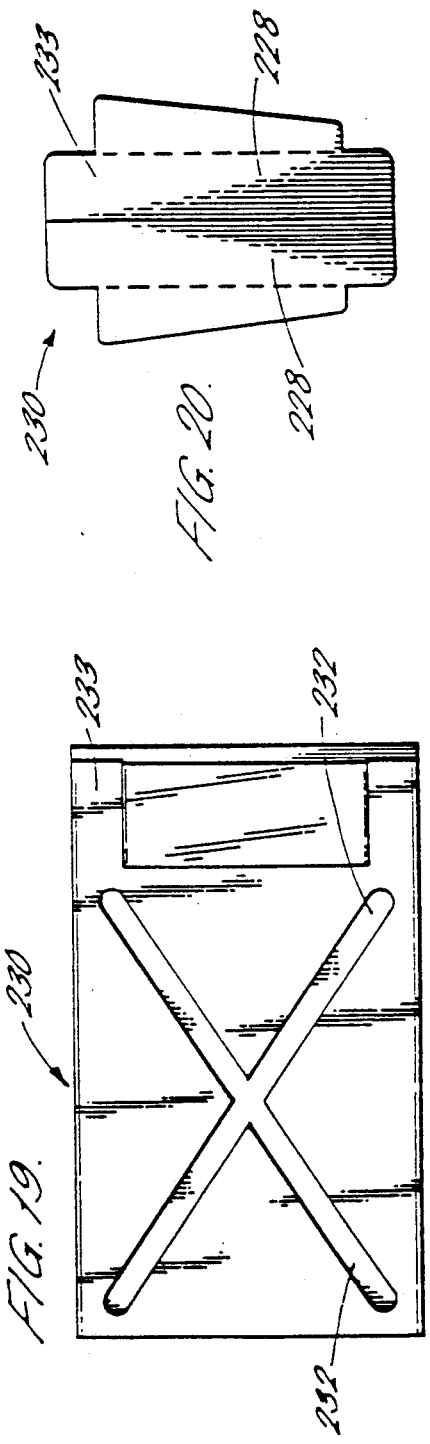

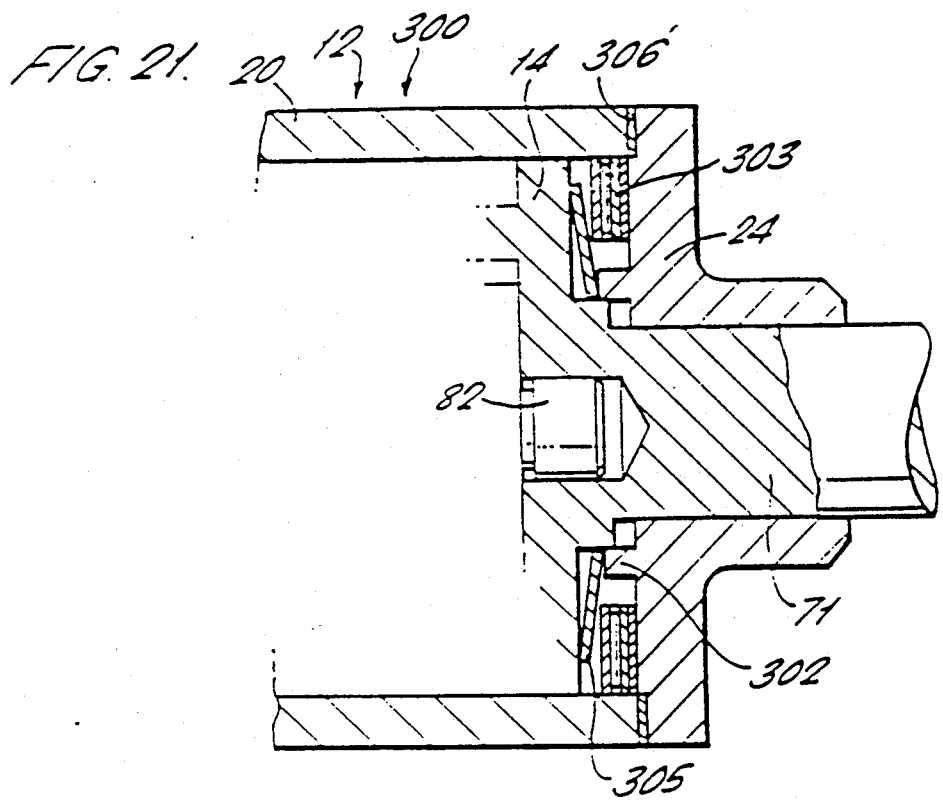
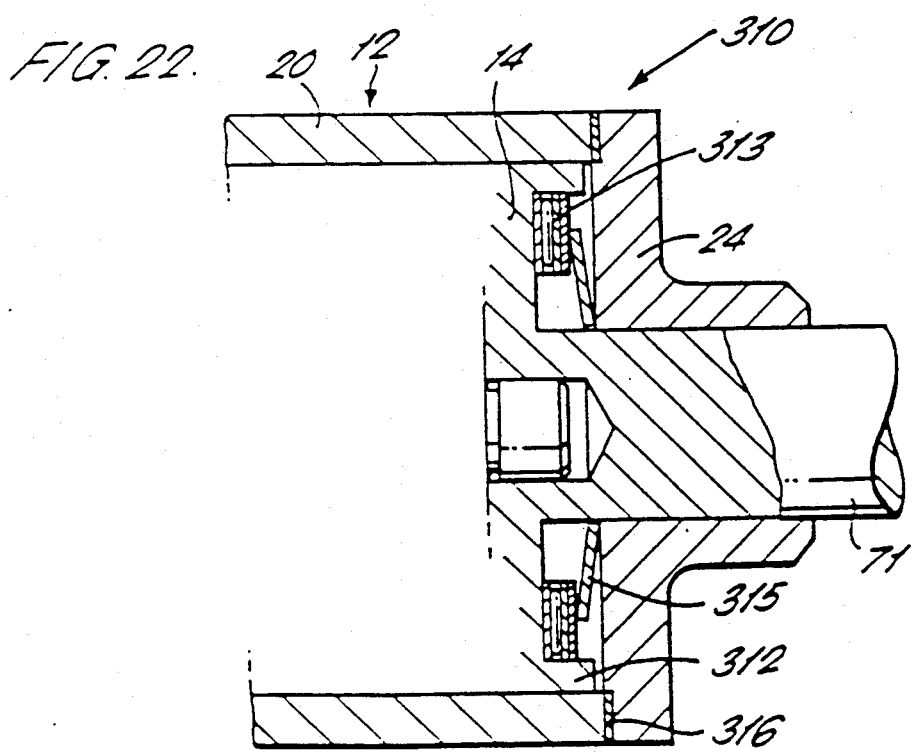

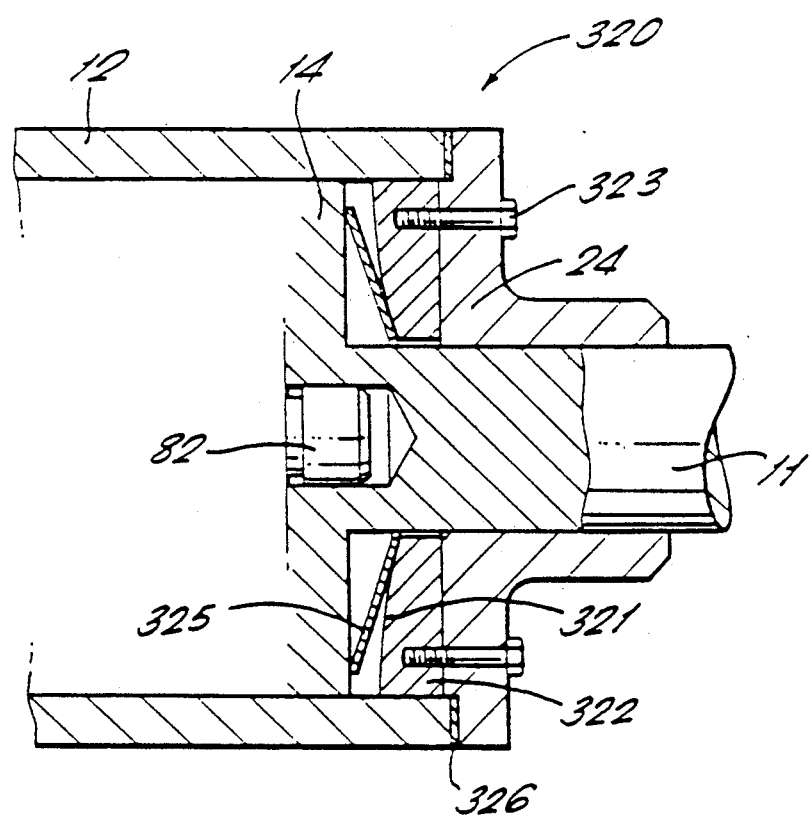

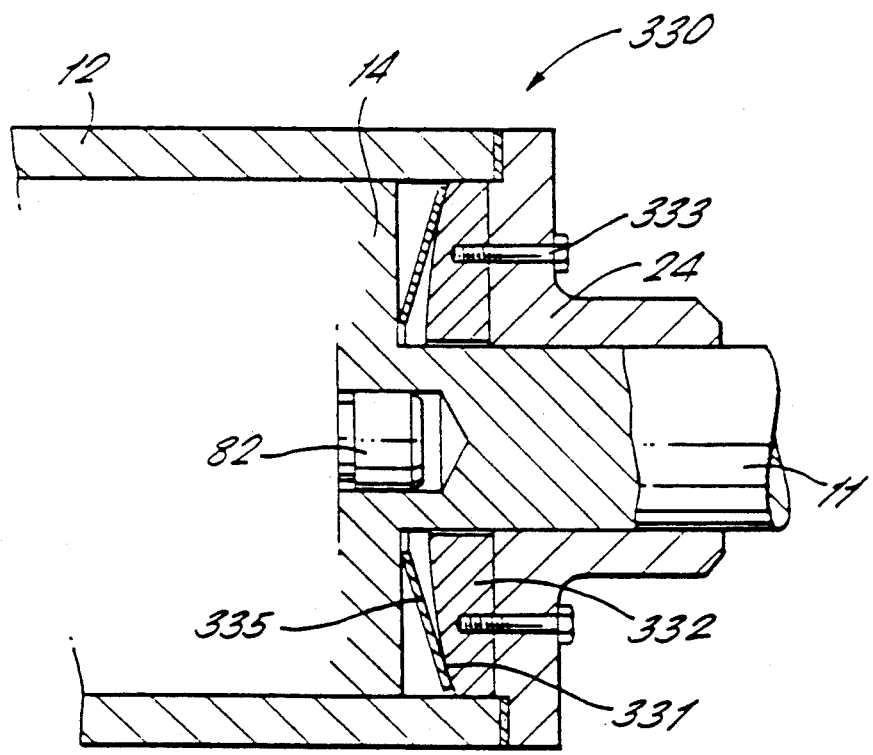

DIFFERENTIAL MECHANISMS

This invention relates to differential mechanisms particularly, but not exclusively, for use as automative differentials in motor land vehicles.

Conventional automotive differentials have a serious operational defect in that power is automatically distributed broadly pro-rata to speed distribution. As a crude generalisation, this can be said to ensure that, when a differential is working and wheels driven via that differential are turning at different speeds, the power will always tend to be distributed in favour of the wheel least able to use it.

Thus, in a condition where one wheel is on gravel or ice and the other wheel is on a surface capable of providing good traction, the wheel on the surface with zero traction will receive 100% of the power being transmitted via the differential and, in consequence, will spin to no avail, while the wheel on the good surface will receive no torque and will not move at all. The end result, of course, is that the vehicle in which the differential is mounted will not move at all.

This problem has been widely recognised for a very long time and many major engineering companies and numerous others have attempted and continue to attempt to solve it.

On a very wide range of both 2- and 4-wheel drive vehicles from high-performance sports and racing cars to heavy-duty, off-highway vehicles, the stated defect in conventional differentials has been regarded as so severe that modified differentials have been, and still are, widely used in an attempt to minimise the adverse effects. The most common form of modified differential is known as a "limited-slip" differential.

In these the ability of one output shaft to turn faster than the other is restricted to a figure, typically in the range of 20-40%. These limited-slip differentials are very much more complex and expensive than conventional differentials and by no means eliminate the stated problem, they simply mitigate its worst excesses. Nevertheless, improved limited-slip differentials continue to be developed and launched by leading automotive engineering companies such as Zahnradfabrik Friedrichshafen AG (ZF AG).

A particular form of "limited-slip" differential which is capable of providing a torque as a function of the speed is based on viscous couplings and is marketed by as the Viscous Control Unit.

In a situation where the two wheels on a driven axle have unequal traction these viscous couplings limit the amount of torque that can be wasted by the wheel with the least traction in a particularly smooth manner and are being adopted widely throughout the automative industry at the present time, particularly on 4-wheel drive vehicles. They do not, however eliminate the basic defect, again they simply mitigate its effects.

An alternative to a limited-slip differential has been the lockable differential. In this the differential capability can be completely blocked when required and thus both wheels will turn at exactly the same speed. Clearly, this approach can provide a significant degree of traction in adverse circumstances but, if maintained for any period of time, will lead to massive tire wear and excessive stresses throughout the transmission system incorporating the differential.

The most refined approach to lockable differentials is perhaps the "ASD" System announced by Daimler-Benz AG at the beginning of 1986. This very sophisticated system relies on multiple sensors to identify wheel-spin and a computerized hydraulic differential locking system. It is, however, by virtue of the sophistication, complex and expensive.

The basic problem in known ordinary differentials stems from the inter dependence in such differentials of speed and torque distribution. It has been recognised that the ideal solution to the basic defect would be completely to split the functions of speed variation and torque distribution. A number of attempts have been made to achieve this. Some of these are described in patents granted to Vernon E. Gleasman, for example U.S. Pat. No. 2,859,641. The technology disclosed in this Patent has been used for many years and differentials according to the Patent are now being manufactured by Gleason under the name "Torsen" Differential. Although these differentials have provided a working arrangement, they have two major disadvantages.

First, the arrangement described in U.S. Pat. No. 2,859,641 includes no less than twenty gear wheels in the configuration described. This compares with the usual four gears in a conventional differential mechanism. Clearly, this significant increase in the number of gear wheels makes this differential very much more expensive to manufacture. This problem is heightened by the fact that some of the gears in this differential cannot be manufactured by usual gear cutting techniques and special techniques and machinery have had to be developed to enable manufacture of the differential.

The second major disadvantage is the likelihood of wear in the Gleasman differential. The reason for the wear problem may be appreciated from an examination of the Gleasman design described in U.S. Pat. No. 2859641. If it is assumed that the differential mechanism as a whole is of the same sort of size as conventional differentials, then it will be appreciated that while the worm gears attached to the half shafts in the described arrangements are of reasonable size, the worm wheels which form the planetary gears are very small in diameter. In practice, these worm wheels are of such a size that they only have six teeth each. It is impossible to manufacture the Gleasman arrangement with much larger worm wheels because the overall diameter of the differential must be kept down in order to maintain adequate ground clearance of a vehicle to which the differential is fitted. Because the worm wheels are of such small diameter and have so few teeth, very small areas of contact exist, in use, between the worm wheels and the worm gears. This causes very high Hertzian surface stress loads and all the problems associated therewith. This wear can cause unacceptable levels of backlash in the differential mechanism thus requiring rebuilding or replacement of the differential.

Another attempt to solve the problems discussed above is described in Patents to Harry Wales, particularly U.S. Pat. Nos. 2,034,318 and 2,220,432. In these patents, drive transmitting bars incorporating teeth mesh with circumferential zig-zag grooves formed in collars which are fixed to the half-shaft of the differential.

Whilst the Wales device reduced the problems of the Hertzian surface stress loads by providing considerable surface area of contact between the teeth on the drive bars and the wavy grooves, the device still has problems associated with it. The provision of several drive transmitting bars inevitably leads to problems of load sharing between the bars. Furthermore the bars are likely to be susceptible to bending due to their length and the loads imposed on them, despite the fact that the bars are located in grooves in a housing in which they reciprocate as they follow the path of the wavy grooves.

The Wales device also has drawbacks as a potential commercial device. It is axially relatively long and is not therefore suitable for installation in existing differential housings. There are also likely to be considerable practical difficulties in manufacturing the wavy grooves on the collars and in achieving conformity between the several drive bars, their teeth and the wavy grooves.

The present invention seeks to reduce or overcome the disadvantages described above. In one aspect the invention provides a differential mechanism comprising an input, two outputs, a face cam member connected to each of said outputs, said face cam members being arranged co-axially and each comprising at least one axially directed helical cam surface portion, said portions being of opposite hand, and at least one cam follower slidably mounted for axial movement relative to said face cam members, the or each of said cam followers including two axially spaced helical cam follower portions of opposite hands for mating abutment against said face cam surfaces, the arrangement being such that relative contra rotation of said outputs drives the or each cam follower to slide axially.

The input is preferably connected to a cage to drive the cage and the or each cam follower is preferably slidably mounted but captured in the cage.

The lead angles of the helical surface portions of the face cam members is preferably selected such that driving movement between each cam surface portion and its respective cam follower is possible in one direction only. This provides irreversible driving engagement between the face cam members and the respective cam followers.

Each face cam member preferably comprises at least one set of cam surface portions, one left hand helix and one right hand helix, linked to form a continuous cam surface. There are preferably two sets of cam surface portions on each face cam member, the two sets both extending circumferentially and co-axially around the face cam member, one radially inward of the other and at least one cam follower being provided for each set.

There are preferably two sets of cam followers, one cooperating with each set of cam surface portions, the cam followers comprising arcuate members arranged co-axially and one set radially inward of the other, the radially outer set being slidably mounted but captured in the cage and the radially inner set being slidable relative to the outer set but captured rotationally thereby.

Each set of cam followers may comprise a pair of rotationally offset followers, the arrangement being such that relative contra-rotation of the outputs and the cam surface portions drives the followers of each pair in opposite directions. Continued relative contra-rotation of the outputs will then cause the or each cam follower to be driven reciprocally between limits of axial movement.

The two sets of cam surface portions on one of the face cam members may also be rotationally offset and may, for example, be rotationally disposed at 180° to each other so that one set of cam followers will always lead the other in axial motion to ensure that one set of cam followers is always in driving engagement with the outputs.

Interengaging means may be provided between the cage and the outer set of cam followers and between the outer and inner sets of cam followers, the interengaging means allowing axial sliding movement therebetween but rotationally fixing the cage and outer and inner sets of cam followers together, whereby rotation of the cage rotates the two outputs through the driving engagement of the cam followers and face cam members. The interengaging means are preferably axial splines.

A generally tubular support may be located between the inner and outer sets of cam followers and co-axial therewith, each set of cam followers being axially slidable but rotationally fixed relative to the support. The inner and outer sets of cam followers may be connected to the support by axial splines.

The or each of the cam followers is preferably single acting and is maintained in compression by its interaction with the face cam members. Means may be provided for adjusting the axial spacing of the face cam members thereby to take up backlash in the differential mechanism. Means may also be provided for applying axially inwardly directed forces to the face cam members thereby to preload the differential mechanism.

The axially spaced cam follower portions of the or each cam follower preferably each comprise two helical portions of opposite hand, in use, one said portion cooperating with its respective face cam surface portion in forward motion condition and the other in overrun or reverse condition. The axially spaced cam follower portions of each cam follower of each pair may be equally divided into left and right hand helical portions and each cam follower may have an arcuate embrace of approximately 180°.

The said equal helical portions of each cam follower may be arranged with the left and right hand helix portions diverging toward the arcuate centre of the cam follower and converging towards its arcuate ends to provide a cam follower which is generally crescent shaped.

Each set of cam surface portions preferably extends around the full 360° circumference of its face cam member and comprises a right hand helix portion and a left hand helix portion, each of 180° arcuate length.

In one embodiment, the axial extremes of the cam surface portions are curved, the curve being tangential to the cam surfaces at both ends and having a radius of curvature increasing from each of its ends to its midpoint. The curve may, for example, be a parabolic arc or an arc of a circle.

In some embodiments, the lead angles of the helical cam surface portions may be such that the or each cam follower may partially backdrive at least one of the face cam members depending on the magnitude of the torque exerted on the outputs.

Greater numbers of cam followers may be provided. There may be n cam followers in each set, each cam follower having an arcuate embrace of 360/n degrees and including equal left and right hand helical portions of 180/n degrees of each of said axially spaced cam follower portions. In one embodiment, n is 4. Each set of cam surface portions may then include left and right hand helical portions of 360/n degrees arcuate length.

The cage of the differential mechanism preferably comprises a central tubular portion and end plates closing off each end of the tubular portion, means being provided for varying the axial spacing of the end plates in order to take up backlash between the face cam members and the cam followers. Spring means may also be provided between the end plates and the face cam members thereby to preload the differential mechanism.

The cage preferably further comprises an annular flange, an input gear for the differential mechanism being fixed to the flange.

Each face cam member preferably comprises a generally circular plate having axially extending annular portions defining said cam surface portions. Each face cam member may further comprise an output shaft co-axial with the plate and integrally formed therewith, the shafts being bearingly supported in the end plates of the cage and extending therethrough. A tubular support may be located radially inwardly of the cam followers and extending between the plates of the face cam members. The support may be located by members having circular portions fixed to open ends of the tubular support and projecting stubs located in recesses within the plates of the face cam members.

Friction reaction surfaces may be provided between each face cam member and the cage and these surfaces may comprise axial projections, for example beads, of disc members fixed to the face cam members adjacent the end plates of the cage so that said projections frictionally engage said end plates. The radius of the annular beads may be preselected to provide a chosen torque arm radius for the reaction surfaces.

The lead angles of the various helical cam surfaces need not necessarily all be equal. The radially outer sets of cam surfaces and cam followers may have helical surfaces of a first lead angle and the radially inner sets of cam surfaces and cam followers may have helical surfaces of a second lead angle, the lead angles being unequal and chosen to compensate for the differing radii of the sliding contact between the cam surfaces and their respective followers.

In one embodiment, the radially inner and outer sets of cam surface portions of one of the face cam members may be relatively axially adjustable in order to compensate for backlash.

The differential mechanism described above may be used as a transfer differential and, in this case, one of said face cam members may have p cam surface portions and the other of said face cam members may have p+2 cam surface portions. In this case, there will be p+1 cam followers, each cam follower including two axially spaced helical cam follower portions, the lead angles of which match their respective abutting cam surface portions.

In one embodiment of a transfer differential, a built in bias between the outputs of a ratio of 2:1 may be provided, a first face cam member fixed to one of the outputs having one left hand and one right hand helical cam surface portion of 180° each, a second face cam member fixed to the other of said outputs having two sets of left and right hand helical cam surface portions of 90° each and there being provided three cam followers each of which has an arcuate embrace of approximately 120°, the axially spaced helical cam follower portions of each cam follower each comprising equal portions of left and right hand helix whose lead angles match the cam surface portions which they abut.

According to another aspect of the present invention, there is provided a differential mechanism as described above, in which friction reaction surfaces are provided acting between each face cam member and the input, at least one face cam member having one or more friction reaction members associated therewith providing at least two friction reaction surfaces at different distances from the axis of the face cam members, and means are provided for engaging said face cam member with first one and then the other or other of said surfaces in response to changes in torque in the differential mechanism.

Preferably one of said friction surfaces comprises a fixed friction member and the other comprises a bearing. Said engaging means may comprise a resilient member engaging in a first position one of said surfaces and movable when the torque in the mechanism exceeds a predetermined value to a second position in which said other surface is engaged. The resilient member is preferably a Belleville washer.

Said one surface may be a fixed reaction surface and said other surface may be a bearing. In one embodiment where the differential mechanism comprises a cage to which the input is provided and in which the friction reaction surfaces are provided between the face cam members and end plates of the cage, the fixed reaction member may comprise an annular bead formed on an end plate of the cage and the bearing may also be carried by said end plate.

In another embodiment, said one surface is a bearing and said other surface is a fixed reaction surface. In this case, the bearing may be carried by the face cam member with which it is associated and the fixed reaction surface may be an axially extending projection of said face cam member.

The differential mechanism of the present invention provides an arrangement in which the mechanism may automatically switch between two torque bias ratio conditions, one being a high torque bias ratio and the other being a low torque bias ratio.

In other embodiments the or each friction reaction member may comprise an annular member having one face radially curved to provide an infinite number of reaction surfaces between inner and outer limits. The curved profile of the annular member may be shaped to provide a predetermined characteristic for the differential mechanism. The inner or outer limit reaction surface of the annular member may comprise a bearing.

In one embodiment particularly useful as a transfer differential mechanism, each face cam member may have an annular friction reaction member associated therewith, the curved profiles of the annular members being different.

The engaging means preferably comprises a resiliently flexible member which engages the annular member in a first position at either said inner or outer limit and, in response to increasing torque in the differential mechanism, engages said annular member in a multiplicity of other positions between said limits.

The annular member is preferably fixed to an end plate of a cage of the differential mechanism and the resilient member is preferably a Belleville washer.

Further features and advantages of the invention will be apparent from the following description, by way of example, of some embodiments of differential mechanisms according to the invention, the description being read with reference to the accompanying drawings in which:

FIG. 4 shows the details of one of the outer set of cam followers of FIG. 1, FIG. 4a being an end elevation of the cam follower and FIG. 4b a view in the direction 4b of FIG. 4a.

FIG. 5 shows views similar to FIG. 4 of one of the inner cam followers;

FIG. 6 is a side elevation of one of the face cam members of the mechanism of FIG. 1;

FIG. 7 is an exploded view of the other face cam member of the mechanism of FIG. 1;

FIG. 8 is a delineation similar to FIG. 3 but showing a modification to the face cams and cam followers of FIG. 1;

FIG. 9 is a further view of the modification of FIG. 8 showing the components in a different relative position;

FIG. 18 is a delineation of the internal operative parts of the mechanism of FIG. 16 showing the engagement between cam surfaces and cam followers of the mechanism 16;

FIG. 19 is a side elevation of one of the cam followers of FIG. 16, and

FIG. 20 is an end elevation of the cam follower of FIG. 19.

FIG. 21 is a scrap section of the right hand end of FIG. 1 showing a modification which is a further embodiment of the present invention;

FIG. 22 is a view similar to FIG. 21 showing a second embodiment of the modification of FIG. 21;

FIG. 23 is a further view similar to FIGS. 21 and 22 and showing a further modification to the differential mechanism of the present invention;

FIG. 24 is a view similar to FIG. 23 of a further variation of the invention.

Figures 1, 2:
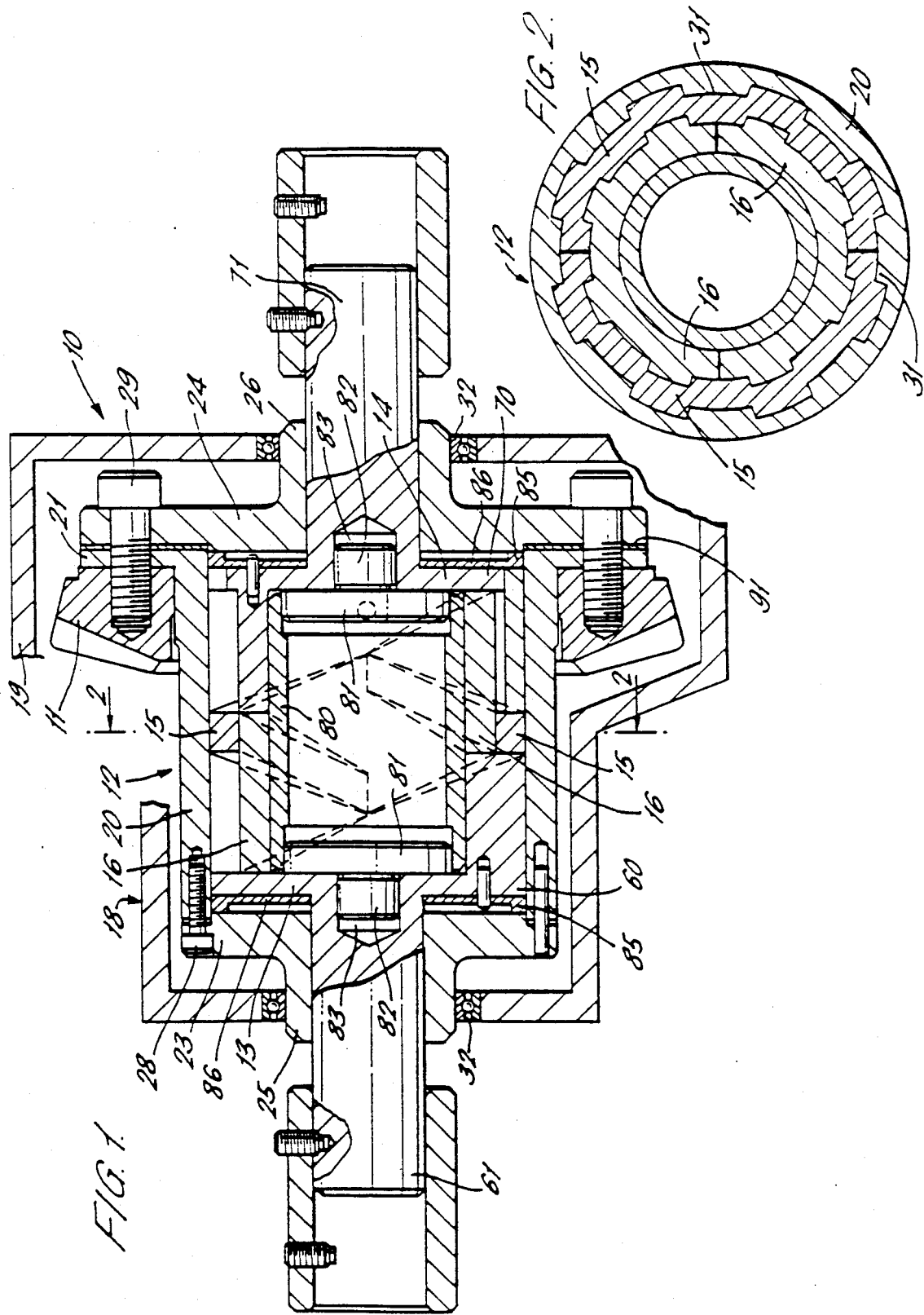
FIG. 1 is a longitudinal section through a first embodiment of a differential gear mechanism according to the invention which certain parts omitted and broken away for clarity.
FIG. 2 is a section along the line 2—2 of FIG. 1.

The drawings show a number of embodiments of a differential mechanism and these will be described in detail below. The basis of the mechanism incorporated into each of these embodiments is the mating engagement between a cam follower and two face cam members each having at least one cam surface. The cam follower is double sided and has follower surfaces in abutting engagement with the cam surfaces of the face cam members.

As a generalisation, the face cam members replace the sun gears in a traditional differential gear mechanism and are fixedly connected to outputs of the mechanism. These outputs may be half shafts, constant velocity joints, splined connections or other appropriate outputs. The cam follower or followers replace the planetary gears of the traditional differential and are slidable but captured in a cage which is fixed to an input gear of the differential mechanism. The input gear may be a hypoid bevel gear or a ring spur gear or other suitable input.

The face cam members are provided with helical cam surfaces and the followers have helical cam surfaces designed to abut and engage the cam surfaces of the face cam members. The basic engineering features of the arrangement is that the lead angles of the helical cam surfaces are selected so that the mating driving engagement between the face cam members and the cam followers is substantially completely irreversible, that is to say the face cam members may drive the cam follower to slide axially relative to the face cam members but the cam follower cannot generally drive the face cam member. It is known that to ensure irreversibility, the lead angle must be selected so that its tangent is less than the coefficient of friction between the two abutting mating surfaces. Applying this basic formula to the more complex mechanisms described below, it is readily possible to calculate appropriate lead angles for the cam surfaces. A typical figure to ensure irreversibility is 14°.

If the lead angles are selected so that there is complete irreversibility between the cam surfaces and followers, then the mechanism is a true "no-slip" differential. However, it is stated above that the driving engagement between the cam surfaces and followers is substantially irreversible. In certain circumstances, the lead angle of the cam surfaces of either one or both of the face cam members may be selected to allow partial reversibility of the driving engagement with the cam followers; for example, the engagement may be 96% irreversible. Such partial reversibility may be selected when it is desired to introduce torque bias between outputs of the differential.

Where the term "irreversible" is used in the remainder of the specification, it is intended to include both complete irreversibility and substantial irreversibility as described above.

It will be appreciated from the description which follows that the cam followers, in the differential mechanisms described, reciprocate during continued relative contra rotation of the two outputs to which the face cam members are fixed. It is possible to design a differential mechanism utilising such reciprocatory movement, because the mechanisms are "no slip" differentials designed to eliminate the high relative speeds of rotation between the outputs which occur in a differential when one wheel slips. Considering a worse case basis, for example when a vehicle to which one of the differential mechanisms described below is fitted is driving up or down a spirally constructed ramp of a multi-storey car park, the maximum relative speed of contra rotation between the outputs is likely to be of the order of 25 revolutions per minute.

Referring now to FIGS. 1 to 7, a first embodiment of a differential mechanism 10 will be described. Referring particularly to FIGS. 1 and 2, the differential mechanism 10 comprises the following main components—an input crown gear 11, a cage 12, left hand and right hand face cam members 13, 14 and first (outer) and second (inner) pairs of cam followers 15, 16. All these main components are contained within a housing 18 which is of generally cylindrical configuration and has an enlarged portion 19 in which the crown gear 11 is located.

The cage 12 comprises a central tubular portion 20 open at both ends and having an annular flange 21 extending outwardly at one end. The tubular portion 20 is closed at both ends by end plates 23, 24 which are generally circular and include central tubular bosses 25, 26. End plate 23 is bolted to tubular member 20 by bolts 28 and end plate 24 is bolted through flange 21 to crown gear 11 by bolts 29. As can be seen in FIG. 2, the central tubular portion 20 of the cage 12 is internally splined having axially extending splines 31.

Tubular bosses 25, 26 are located in bearings 32 provided within the end walls of housing 19. The bearings 32 may be of any suitable type and will be provided with necessary oil seals and so on (not shown).

The outer pair of cam followers 15 are shown best in FIG. 4 Each cam follower 15 is a generally crescent shaped member having an arcuate embrace of 180°. The cam follower 15 is provided on its radially outer surface with axial spines 40 which mesh with splines 31 on the inner surface of cage 12 so that each cam follower 15 is able to slide axially relative to the cage but is captured by the cage and rotationally fixed thereto. The radially inner surface of each cam follower 15 is also provided with axially extending splines 42.

The axial end faces 43, 44 of each cam follower 15 are provided with axially directed cam follower surfaces. Each face 43, 44 of each cam follower 15 includes two helical cam follower surfaces, each of 90° arcuate length, one being a left hand helix and the other being a right hand helix. The left and right hand helices are arranged to diverge towards the arcuate centre of the cam followers 15 and to converge towards their arcuate ends as shown in FIG. 4b. This provides the crescent shape of the cam follower 15. The lead angles of the cam follower surfaces 45, 46 are selected to mesh with their respective cam surfaces as described below and the radial thickness of the cam follower 15 is chosen to ensure an adequate contact surface area of the surfaces 45, 46.

It is to be noted that the pair of outer cam followers 15 together provides a 360° arcuate embrace but the two cam followers 15 are independently axially slidable relative to one another.

The radially inner pair of cam followers 16 are shown most clearly in FIG. 5. Each cam follower 16 is provided on its outer surface with splines 50 which mesh as shown in FIG. 2, with splines 42 of outer cam followers 15. Cam followers 16 may therefore slide axially relative to cam followers 15 but are captured by and rotationally locked to cam followers 15 and thence to cage 12. It will be noted from FIG. 2 that the pair of cam followers 16 are arranged rotationally offset by 90° from cam followers 15. The cam followers 16 are free to move axially relative to each other without reference to each other or to either of the outer pair of cam followers 15. It will be appreciated that arrangement of the sets of axial splines 31, 40, 42, 50 is such that all four cam followers 15, 16 can slide independently on each other axially of the cage but cannot rotate relative to the cage.

Each inner cam follower 16 is again crescent shaped and includes cam follower surfaces 51, 52 on its end faces 53, 54. The surfaces 51, 52 are similar to surfaces 45, 46 described above and each includes a right hand and a left hand helical portion, the right and left hand helices being arranged to diverge towards the arcuate centre of the cam followers 16 and coverage towards their arcuate ends so as to provide the crescent shaped follower 16. The lead angles of the helical surfaces 51, 52 are chosen to engage with their respective cam surface as will be described below, but are not necessarily the same lead angles as those selected for surfaces 45, 46. This is described in more detail below.

The left hand face cam member 13 (as viewed in FIG. 1) comprises a base plate 60 integrally formed with a cylindrical stub shaft 61 which extends through tubular boss 25 and is supported in plain bearings therein. The axially inner (right hand) face of plate 60 is provided with cam surfaces 63, 64 (see FIG. 6) for mating engagement with the outer and inner cam followers 15, 16. The cam surfaces 63, 64 are disposed radially one within the other and around the circumference of base plate 60. Each cam surface comprises two helical cam surface portions, each having an arcuate length of 180°, one being a left hand helix and one being a right hand helix. The left hand face cam member 13 is shown in more detail in FIG. 6. It will be appreciated from FIG. 6 that, in the particular embodiment shown, the cam surfaces 63, 64 are rotationally disposed in phase with each other and are of the same lead angle. The effect of this is that the two cam surfaces 63, 64 merge to provide a single, double depth, cam surface on the face cam member 13. The surface 63, 64 are of course axially inwardly directed and the lead angles of the surfaces are chosen for mating engagement with the surfaces 45, 51 of cam followers 15, 16.

The right hand face cam members 14 again comprises a generally circular base plate 70 having an integrally formed cylindrical stub shaft 71. The shaft 31 extends through cylindrical boss 26 of the cage 12 and is supported in plain bearings therein. Two cam surfaces 73, 74 (see FIG. 7) are provided facing axially inward on the inner (left hand) face of plate 70. As described above with reference to left hand face cam members 13, the outer and inner cam surfaces 73, 74 each comprise two helical profile cam surface portions, the two portions each having an arcuate length of 180° and consisting of a left hand helix and a right hand helix. However, in the case of face cam member 14, the outer and inner cam surfaces 73, 74 are rotationally disposed 180° out of phase with each other so that the axially innermost (highest) part of one cam surface is circumferentially adjacent to the axially outermost (lowest) portion of the other cam surface. This is most clearly seen in FIG. 7.

As can be seen in FIG. 7, the face cam member 14 is formed from two components. Inner component 76 includes the base plate 70 and stub shaft 71 and has formed thereon the inner cam surface 74. Cam surface 73 is formed on an outer generally tubular component 77 which fits over component 76 and is secured thereto by bolts or other suitable fixings (not shown) passing through holes 78 in the two components 76, 77.

As discussed above, outer cam surface 63, 73 are in mating engagement respectively with cam follower surfaces 45, 46. Similarly, inner cam surfaces 64, 74 are in mating engagement with inner cam follower surface 51, 52. The outer cam surfaces 63, 73 both have right and left hand helices of the same lead angle. Furthermore, the inner two face cam surfaces 64, 74 have right and left hand helical cam surface portions having the same lead angle as each other. The lead angles of the inner cam surface portions are not, however, necessarily the same as the lead angles of the radially outer cam surface portions.

A tubular internal support member 80 is located coaxially within the outer and inner cam followers 15, 16 and extends between the base plates 60, 70 of face cam members 13, 14 radially within the cam surfaces. The support tube 80 provides support for the cam followers 15, 16 as they travel axially relative to the cage 12. The cam followers 16, in turn, support the cam followers 15. As shown in FIG. 1, the tubular support 80 is not fixed to the inner cam follower 16 in any way, but is supported by disc like members 81 fixed within the ends of tubular support 80 and having integrally formed cylindrical projections 82 located within corresponding cylindrical recesses 83 formed centrally in the members 13, 14.

To ensure satisfactory operation of the differential mechanism 10, friction reaction surfaces between the face cam members 13, 14 and the end plates 23, 24 of the cage are provided by axially projecting surfaces 85 forming annular beads on annular discs 86 which are fixed to the outer faces of plates 60, 70 surrounding shafts 61, 71. As shown in FIG. 1, the reaction surfaces 85 are provided at the outermost edges of discs 86 so that the effective torque arm radius of the reaction surfaces is as large as possible within the constraints of the diameter of the cage 12. It will be appreciated that this effective torque arm radius may be preselected prior to assembly of the differential mechanism by substituting for discs 86 other similar discs in which the annular beads 85 are formed at positions radially inward of those shown in FIG. 1. By this means, the effective torque arm radius of the friction surface may be varied from a small value to the maximum value shown in FIG. 1. Alternatively, the friction reaction may be reduced substantially to zero by substituting for annular beads 85 needle thrust roller bearings which have a very low coefficient of friction approximating to zero.

It will be appreciated that the cam followers 15, 16 are assembled between the face cam members 13, 14 and the abutment of the respective cam and cam followers surfaces is ensured by the clamping action of end plates 23, 24 when these are bolted to central cage portion 20. In order to minimise backlash between the components shims may be provided for example at 81 and the thickness of the shims may be selected to ensure optimum mating engagement between the cam surface and cam followers.

The crown or ring gear 11 is a hypoid bevel gear of a type well known in existing differential mechanisms. In use, the ring gear 11 meshes with a hypoid bevel pinion (not shown in FIG. 1) in known manner.

The operation of the differential mechanism 10 is as follows. As indicated above, the basis of the principle of operation is the irreversibility of the driving engagement between the cam surfaces formed on the face cam members 13, 14 and the cam followers 15, 16.

When a vehicle in which differential mechanism 10 is mounted is travelling in a straight line, there is no relative contra-rotation between the outputs 61, 71 of the differential mechanism and the drive provided to the ring gear 11 rotates the cage 12, cam followers 15, 16 and face cam members 13, 14 as a unit, thus providing drive to the outputs 61, 71.

Figure 3A:
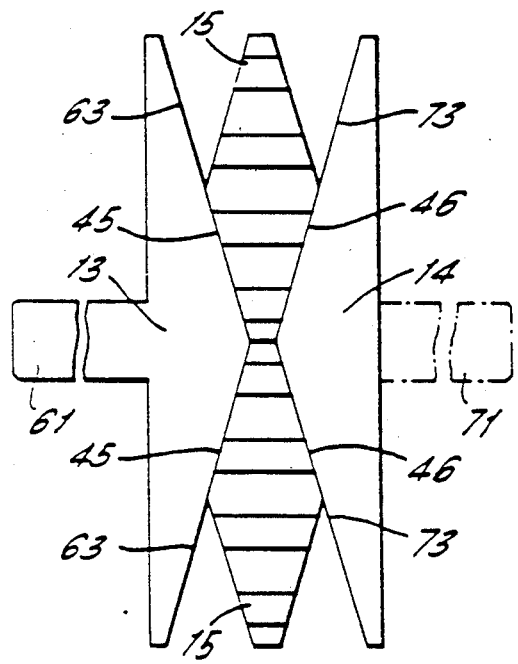
FIG. 3 is a delineation of the internal operative parts of the mechanism of FIG. 1 showing in FIG. 3a the engagement between one set of cam surfaces and cam followers of the mechanism of FIG. 1, in FIG. 3b the engagement between the other set of cam surfaces and followers and in FIG. 3c both sets of cam surfaces and followers superimposed one upon the other.

However, when the vehicle travels around a corner, relative contra-rotation between the outputs 61, 71 must take place. If it is assumed for ease of explanation that the cage 12 is now locked to earth and a relative contra-rotation of the outputs 61, 71 takes place, it will be appreciated that the face cam members 13, 14 rotate relative to one another thereby rotating the cam surfaces. As the cam surfaces rotate, the abutting engagement between those cam members and their respective cam followers cause the cam followers to travel axially, respective ones of each pair of inner and outer cam followers travelling in opposite directions. This action may be better appreciated by reference to FIG. 3. FIG. 3 is a delineation of the cam surfaces and cam followers. For clarity of explanation, FIG. 3 is in three parts. FIG. 3a shows, delineated, the engagement between the outer face cam surfaces 63, 73 and the follower surfaces of the outer cam followers 15. If it is imagined that face cam member 13 moves upwards while face cam member 14 moves downwards, then it will be appreciated that upper cam follower 15 as viewed in FIG. 3a moves to the right whilst lower cam follower 15 moves to the left.

Figure 3B:
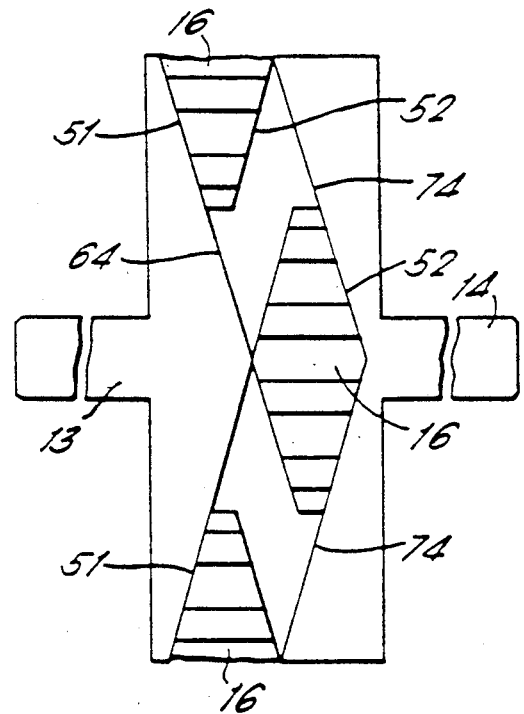

FIG. 3b shows delineated the engagement of inner cam surfaces 64, 74 with inner cam followers 16. It will be appreciated that because FIG. 3 is a delineation, one of the inner cam followers 16 is shown split in half with part of it appearing at the top of FIG. 3b and part at the bottom. Again, it will be appreciated from a consideration of FIG. 3b that if differentiation is simulated by imagining face cam member 13 moving upwardly and face cam member 14 moving downwardly then the cam follower 16 which is split will move to the right while the other cam follower 16 will move to the left.

Figure 3C:
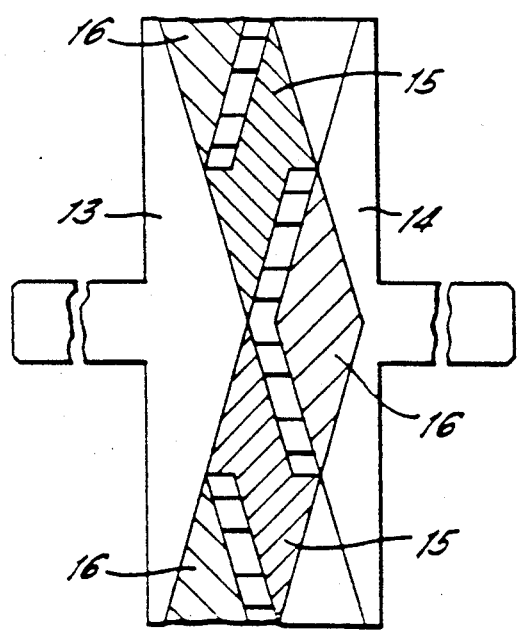

FIGS. 3a and 3b show only the outer and inner sets of cam surfaces and cam followers respectively for ease of explanation and clarity. FIG. 3c shows both sets of cam surfaces and cam followers on the same drawing. FIG. 3c is, of course, obtained by FIGS. 3a and 3b being superimposed one upon the other. FIG. 3c shows clearly the overlap between the cam followers 15, 16 (represented by horizontal lining in FIG. 3c). FIG. 3c shows the overlap at its minimum or worst case position where one pair of cam followers is at the limit of its axial travel towards the outer ends of cage 12 and the cam followers of that pair (cam followers 16 in FIG. 3) are about to reverse. As can be seen, each pair of cam followers has sufficient axial length that even when all the cam followers are at their limit of travel, there is sufficiently large axial overlap between the cam followers to transmit rotational drive through the engaging splines between the followers.

Considering again the delineations shown in FIG. 3, it will be appreciated that the pairs of outer and inner cam followers 15, 16 reciprocate if relative contra-rotation of the shafts 61, 71 continues. As mentioned above, the inner cam followers 16 are shown in FIG. 3b at their limit of axial travel. Relative movement of face cam members 13, 14 will cause the cam followers 16 to move to the right and left respectively as described above. It will be appreciated that continued relative movement of members 13 and 14 will eventually bring the left hand cam followers 16 as shown in FIG. 3b to the axial position occupied by the right hand cam follower as shown in FIG. 3b and vice versa. Equally, the outer cam followers 15 shown in FIG. 3a will move respectively from the positions shown in FIG. 3a to the left and then to the right and vice versa. The fact that the two sets of cam followers are offset by 90° as described above ensures the necessary overlap so that there is always adequate engagement between the cam followers.

As described above, each cam follower is provided on each axial face with right and left hand helical cam follower portions. This is necessary in order to accommodate forward drive in one direction and drive in overrun or reverse conditions in the other direction. It is to be noted that the cam followers and face cam surfaces are only single acting. Because of this, it is very simple to take up backlash in the transmission. As has been described above, the axial positions of the end plates 23, 24 of the case are adjusted by shims and backlash can be taken up by adjusting the thickness of these shims. The cam followers as they are acted upon by the cam surfaces are always in compression and never in tension and it will be observed that there are no bending forces imposed on them. Each pair of cam followers 15, 16 may be machined as one unit in order to ensure that, in operation of the differential mechanism, load sharing between the cam followers is satisfactory.

Reference has been made above to various prior art arrangements of differential mechanisms employing worm gears and worm wheels. Compared with such arrangements, the differential mechanism 10 described above has very significant advantages. A major advantage is that there is a very large area of contact between the cam surfaces of the face cam members 13, 14 and the cam followers 15, 16. Examination of the drawings particularly FIG. 3, will show that, at any given moment, very large areas of contact between the cam surfaces and cam followers are present. These large areas of contact dramatically reduce the Hertzian surface stress loads in the elements of the differential mechanism and this in turn reduces wear very considerably. This is a very significant advantage because it is known that limited wear produces disproportionately great backlash in devices of this kind and the amount of allowable wear before the mechanism is unusable is therefore limited.

Another advantage of the differential mechanism 10 is that, although it operates by relying on linear reciprocating motion of the cam followers, the overall arrangement is compact, particularly in the axial direction, and the differential mechanism 10 is capable of installation into existing differential housings of standard motorcars without the need for modification to the vehicles drive axles and other components.

Many modifications may be made to the differential mechanism 10 described above without fundamentally altering any of the essential components of the mechanism or its method of operation. Examples of some such modifications are shown in FIGS. 8 to 11.

FIGS. 8 and 9 show delineations similar to

FIGS. 3a and 3b of the outer and inner sets of cam surfaces and cam followers. It will be seen in FIGS. 8 and 9 that adjacent helical portions of opposite hands of both the cam surfaces and cam followers are now joined together by curved portions 100. In each case, the curve selected to join adjacent helical cam surface portions is chosen so that the curve is tangential to and smoothly merges with the cam surface portions at its ends and so that the curve has an increasing radius moving from each end of the curve to its central point. In the examples illustrated in FIGS. 8 and 9, the curve chosen is a parabolic arc but it will be appreciated that other suitable curves may be used. The purpose of the modification depicted in FIGS. 8 and 9 is to provide a smoother transfer as each cam follower reaches its limit of travel in one axial direction and reverses in order to reduce the amount of noise produced in operation of the mechanism.

Figure 10:
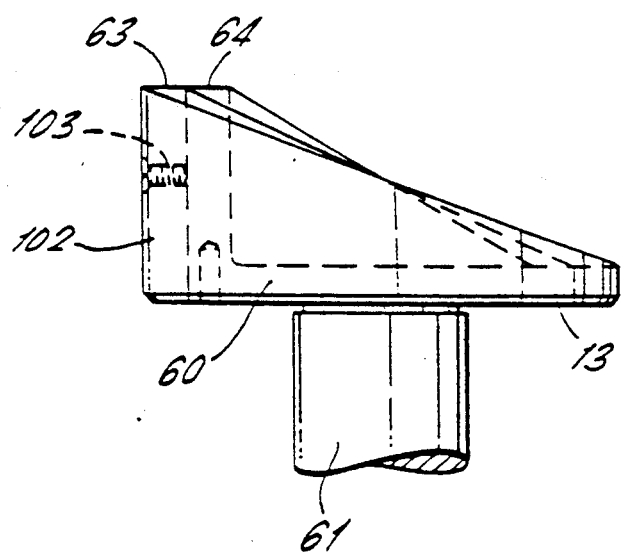
FIG. 10 is a view similar to FIG. 6 showing a modification of the face cam member of FIG. 6.

FIG. 10 shows a modification to the left hand face cam member 13. As has been described above, backlash which may be present in the differential mechanism 10 is taken up by adjustment of the axial position of the end plates 23, 24 of the cage 12. However, whilst this deals with overall backlash present in the device, differences between the inner and outer pairs of cam followers may mean that there are different amounts of backlash present between the two pairs of cam followers. In order to provide independent axial adjustment of the inner and outer sets of cam surfaces and cam followers, the modified face cam member 13 shown in FIG. 10 may be employed. In FIG. 10, like reference numerals indicate the same part as described above with reference to FIG. 6. The face cam member 13 still includes a base plate 60 integrally formed with a shaft 61 and carrying on its inner surface means defining the inner cam surface 64. However, in FIG. 10, the outer cam surface 63 is provided on a separate tubular component 102 which is axially adjustable relative to face cam member 13 and includes means to secure component 102 to the face cam member 13. As shown in FIG. 10, the two parts of the face cam member are splined together to allow the axial adjustment of component 102 and grub screws 103 are provided to secure component 102 in position. It will be appreciated that backlash present between the two pairs of cam followers may be taken up by adjustment of the relative axial positions of cam surfaces 63, 64 before final assembly of differential mechanism 10 and before overall backlash is taken up by adjustment of the end plates 23, 24.

The support tube 80 shown in FIG. 1 is supported at its end by the shafts 61, 71 and is described as having a smooth outer surface supporting but not engaging the inner surface of inner cam followers 16. The support tube 80 may be modified to have a splined outer surface engaging with splines provided on the inner surfaces of cam followers 16. This modification may be introduced in order to ensure that the tubular support 80 rotates with the inner cam followers 16 in order to exercise more control over the inner cam followers and also, for example, to provide a reaction point for some other device such as a servo mounted in the cylindrical space within the tubular support 80.

Figure 11:
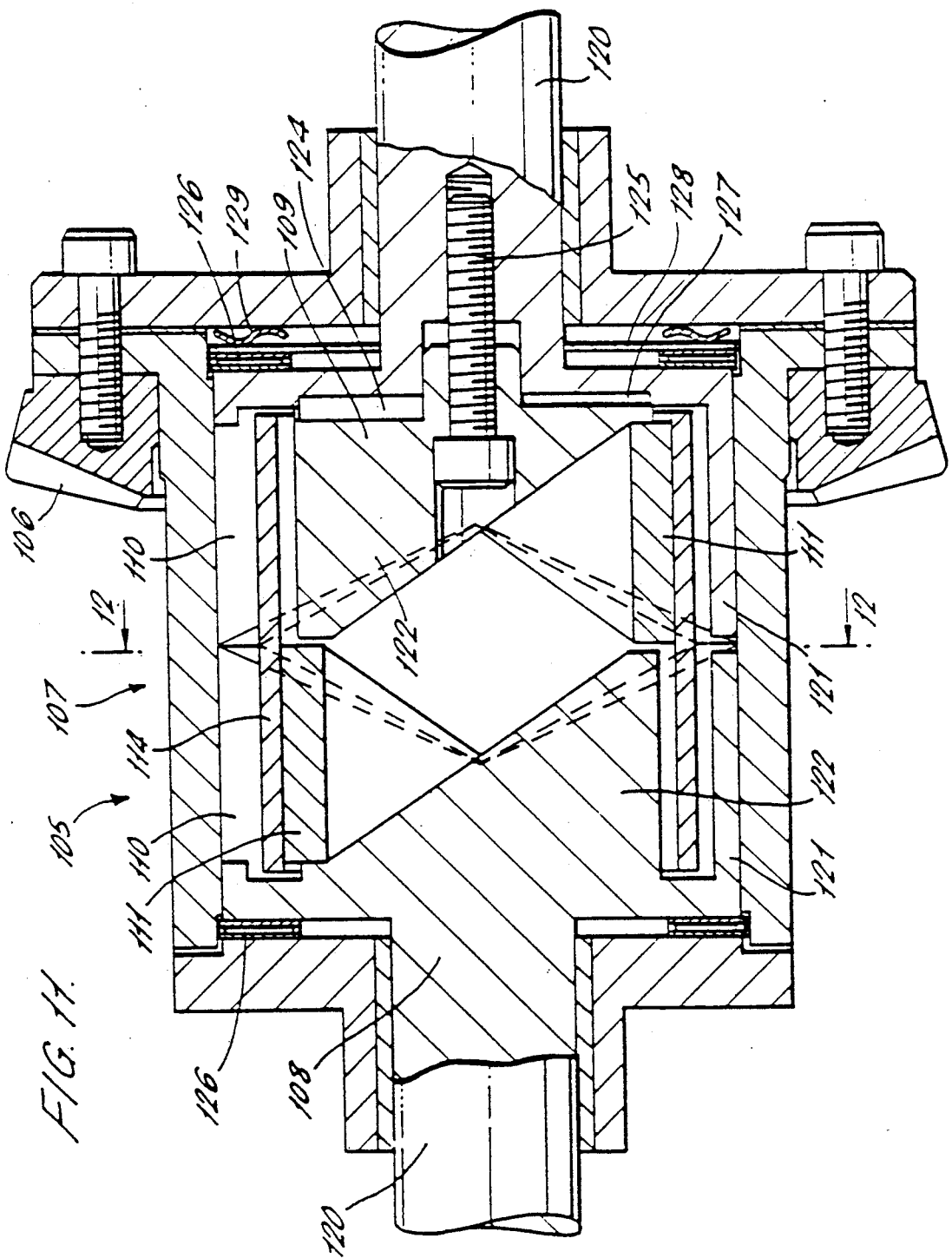
FIGS. 11 and 12 are sections similar to FIGS. 1 and 2 of a second modified embodiment of a differential mechanism according to the invention.
Figure 12:
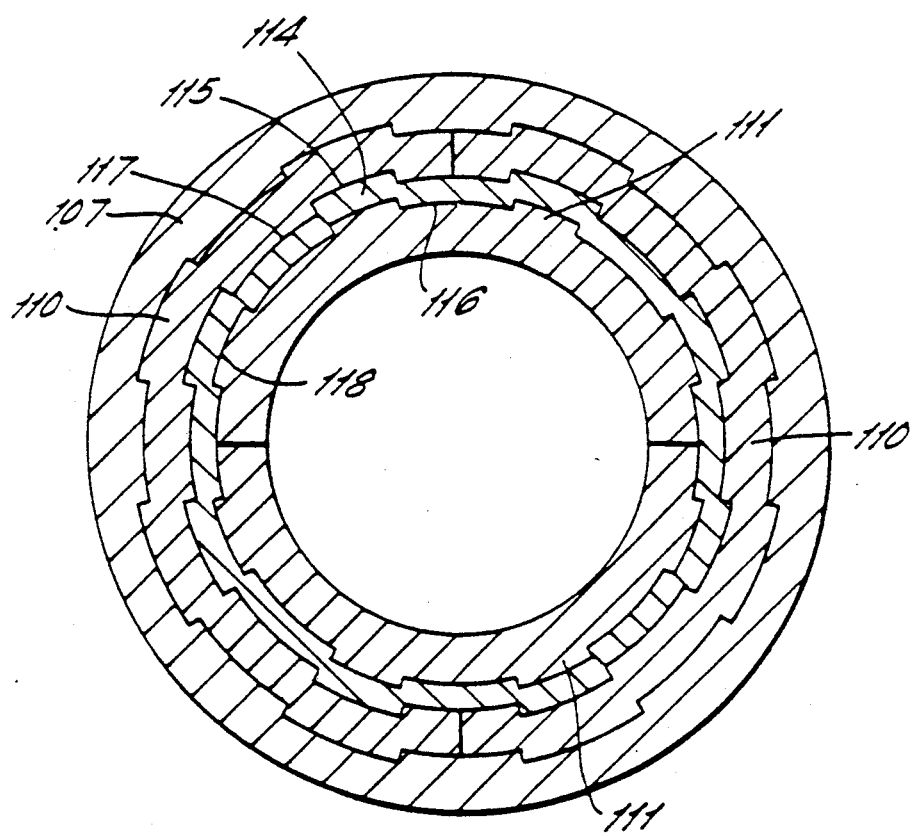

A further embodiment of a differential mechanism showing another possible modification to the tubular support is shown in FIGS. 11 and 12. Referring now to FIGS. 11 and 12, the differential mechanism 105 comprises the same main components as the differential mechanism 10 described above, that to say an input crown gear 106, a cage 107, left hand and right hand face cam members 108, 109 and outer and inner pairs of cam followers 110, 111. The face cam members 108, 109 and cam followers 110, 111 include mating helical cam surfaces the basic shape and operation of which are exactly as described above with reference to FIG. 1.

However, in FIGS. 11 and 12, a tubular support 114 for the cam followers is no longer radially inward of the inner pair of cam followers but is instead provided between the outer and inner pairs of cam followers 110, 111. This can be clearly seen from a comparison of FIG. 12 with FIG. 2. In FIG. 12, the tubular support 114 is provided with axially extending splines 115 on its outer surface and axially extending splines 116 on its inner surface. Splines 115 mesh with splines 117 on the inner surface of outer cam followers 110 while on splines 116 mesh with splines 118 provided on the outer surface of inner cam followers 111. The outer cam followers 110 are splined to the inner surface of cage 107 in exactly the same way as described above with reference to FIG. 1. The outer and inner cam followers 110, 111 are thus still free to move axially relative to each other, to the cage and to the support 114 while the cage, outer cam followers 110, support 114, and inner cam followers 111 are all rotationally locked together to rotate as a single unit.

The tubular support 114 in FIGS. 11 and 12 still extends axially between base plates of the face members 108, 109 and, for this purpose, annular spaces are provided in the face cam members between the inner and outer cam surfaces in order to accommodate the support 114. This is shown particularly in FIG. 11 where it can be seen that each face cam member 108, 109 is formed from two components bolted together. An outer component 120 of each face cam member includes the base plate of the member, an integrally formed shaft and the axially extending outer face cam surface 121. A second inner component 122 of each face cam member defines the inner face cam surfaces, is keyed to the outer component 120 at 124 to prevent relative rotation of the two components and is fixed to the outer component by bolt 125.

It will be appreciated that the two face cam members 108, 109 may be formed from the same two components 120, 122. In FIG. 11, right hand face cam member 109 which includes 180° out of phase inner and outer cam surfaces has the two components 120, 122 in the relative position shown. Left hand face cam member 108 which has its inner and outer cam surfaces in phase is formed by fixing the two components 120, 122 together with the components rotated relative to each other through 180° compared with face cam member 109. To allow the fixing of component 122 relative to component 120 in either of these two positions, the outer component 120 is formed with a second keyway 127 as shown in FIG. 11.

The embodiment of the differential mechanism 105 shown in FIG. 11 also illustrates two further features which may also be provided in other embodiments of the differential mechanism. Instead of the friction reaction surfaces described above with reference to FIG. 1, needle race roller bearings 126 are provided. The needle bearing 126 provided for the right hand face cam member 109 is located between the base plate of the face cam member and a disc 128. A wavy spring washer 129 is located between the disc 128 and the end plate of housing 107. This spring 129 provides an axially inwardly directed force when the cage 107 is assembled thereby preloading the components of the differential mechanism.

It will be appreciated that the repositioning of the tubular support 114 as described above with reference to FIGS. 11 and 12 provides substantial support for the inner and outer cam followers even when these cam followers are at their limits of axial travel. The entire splined surface area of the inner cam followers is in constant driving engagement with the tubular support and likewise the entire splined surface area of the outer cam followers is in driving engagement with the tubular support and the cage. This arrangement eliminates the need for axial overlap between the two pairs of cam followers. Thus the cam followers can be made axially narrower by the amount of the former overlap that was required in the embodiment of FIG. 1 but is no longer required.

This in turn allows for a large helix angle, if desired, for given axial length of the cam followers. In the embodiments described, the lead angle of the helical surfaces of the cam followers may be increased from approximately 14° in FIG. 1 to, say, approximately 17° by shortening the cam followers in FIG. 11 to remove the axial overlap between them.

A further advantage of the differential mechanism 105 is that the cam followers may readily be made from a different material to the rest of the mechanism without experiencing the problems associates with the situation of like materials being in sliding contact with each other. For example, the cam followers may be manufactured from phosphor bronze in order to adjust the coefficient of friction between the cam surfaces and cam followers. As has been described above, the amount of bias in the differential mechanism is a function of the lead angles of the helical cam surfaces and the coefficient of friction between the various components. The substitution of a material such as phosphor bronze for the cam followers may therefore be used to adjust the bias of the differential mechanism.

It has been described above that the lead angles of the helical cam surfaces are chosen either to ensure complete irreversibility of engagement between the cam surfaces and the cam followers or to allow a limited degree of reversibility. In FIG. 1, the lead angles of the helices of all the cam surfaces have been depicted as the same. However, since the effective torque arm radius of the areas of contact between the inner face cam surfaces and their cam followers is smaller than that of the areas of contact between the outer face cam surfaces and their cam followers, the degree of reversibility between the two sets of cam surfaces and followers will be different if the same lead angles are used. In order to compensate for this, a different lead angle may be chosen for the inner set of cam surfaces and cam followers.

As has also been described above, provision may be made for increasing the lead angles of the helical surfaces by shortening the cam followers in the differential mechanism 105.

Figure 13:
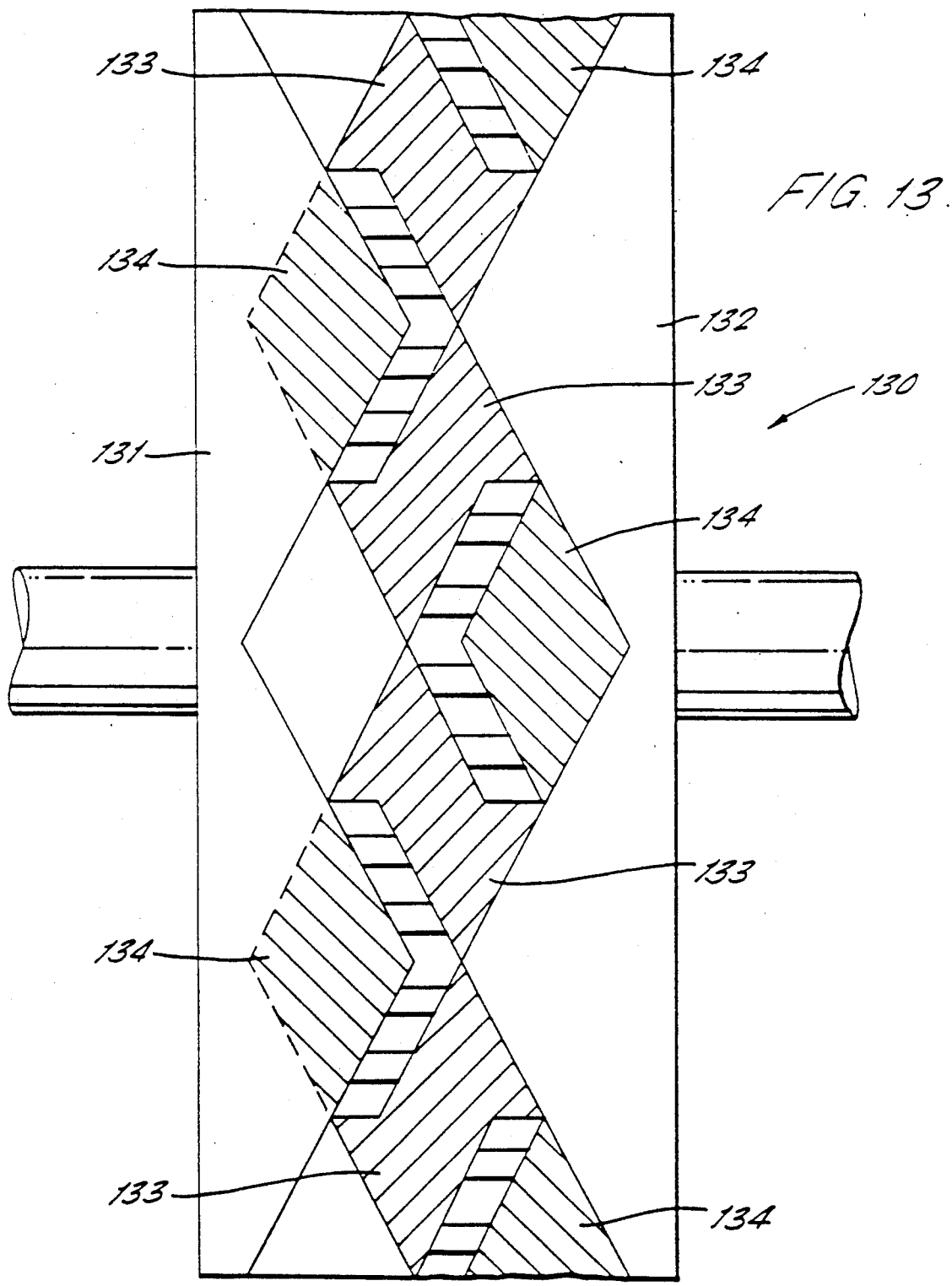
FIG. 13 is a delineation similar to FIG. 3 of a further embodiment of a differential mechanism having twice as many cam followers.

Alternatively, the lead angle of the helix may be more radically increased by increasing the number of cam followers. An example of this is shown in FIG. 13. FIG. 13 is a delineation similar to FIG. 3 of the differential mechanism and it will be observed that the differential mechanism 130 of FIG. 13 includes four pairs of cam followers and corresponding cam surfaces on the face cam members 131, 132. The areas of overlap between the cam followers are again depicted by horizontal lining. In FIG. 13, the radially outer cam followers are indicated by 133 and the radially inner cam followers by 134. It will be observed that there are four cam followers in the differential mechanism 130 of FIG. 13 and there are correspondingly four cam surfaces on each face cam member, two left hand and two right hand helical portions each of 90° arcuate length. The cam followers 133, 134 include on each of their axial sides equal portions of left hand and right hand helical surfaces, each portion being of 45°. The arcuate embrace of each cam follower is 90°.

It will be appreciated that the number of cam followers may be further increased with a corresponding increase in the lead angle. In general, if there are n cam followers, the arcuate embrace of each cam follower will be $360/n°$, each cam follower will include left and right hand helical portions on each of its axial faces of 180/n° and each face cam member will include end cam surfaces of 360/n°.

Figure 14:
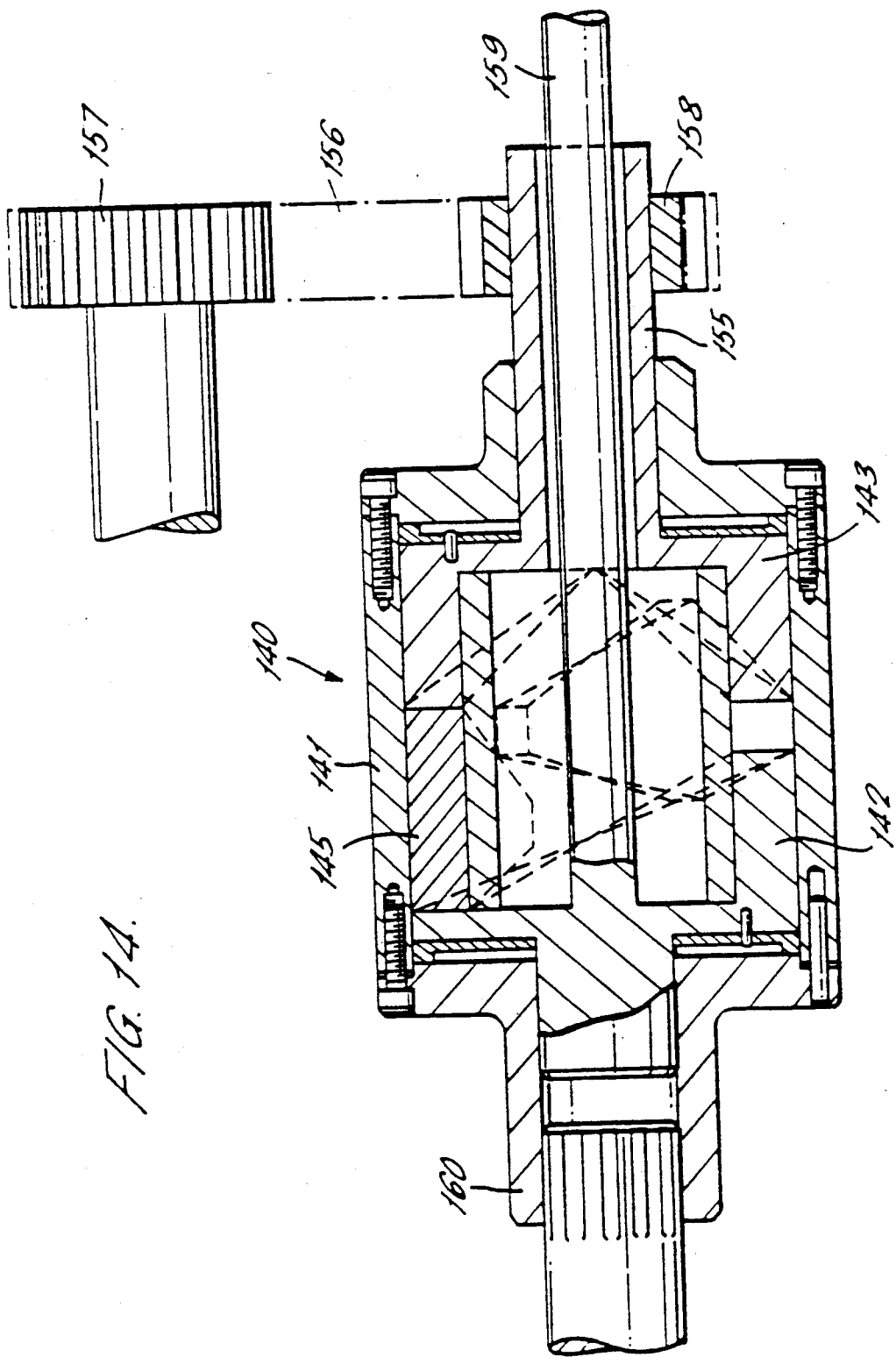
FIG. 14 is a longitudinal section through a still further embodiment of a differential mechanism, particularly suitable as a transfer differential.
Figure 15B:
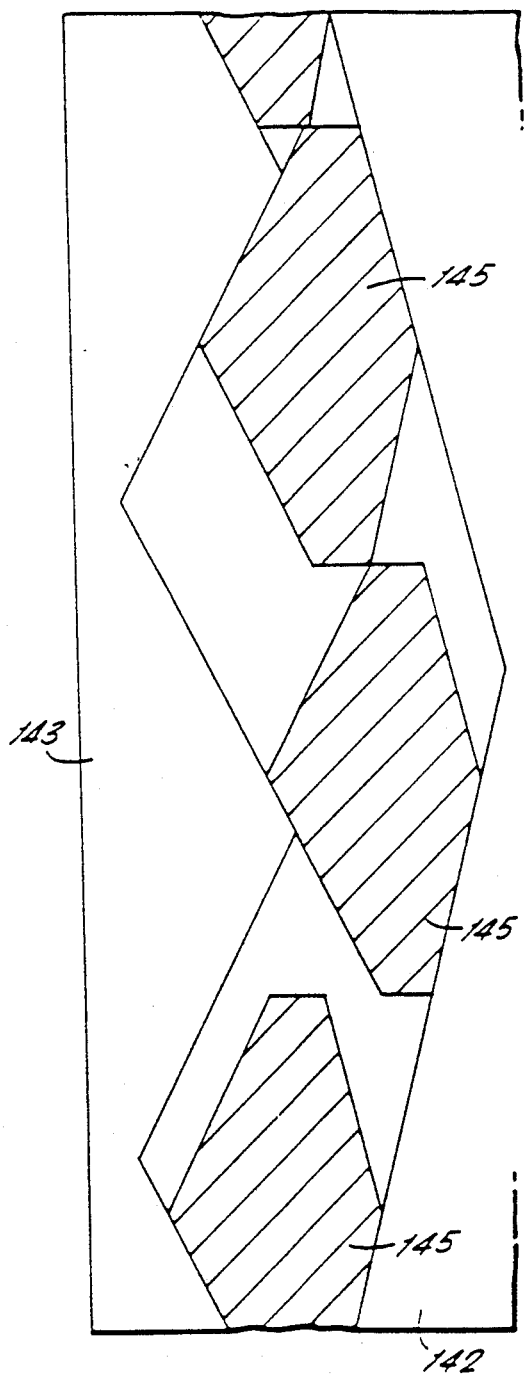
FIG. 15 is a delineation of the internal parts of the mechanism of FIG. 14.
Figure 15A:
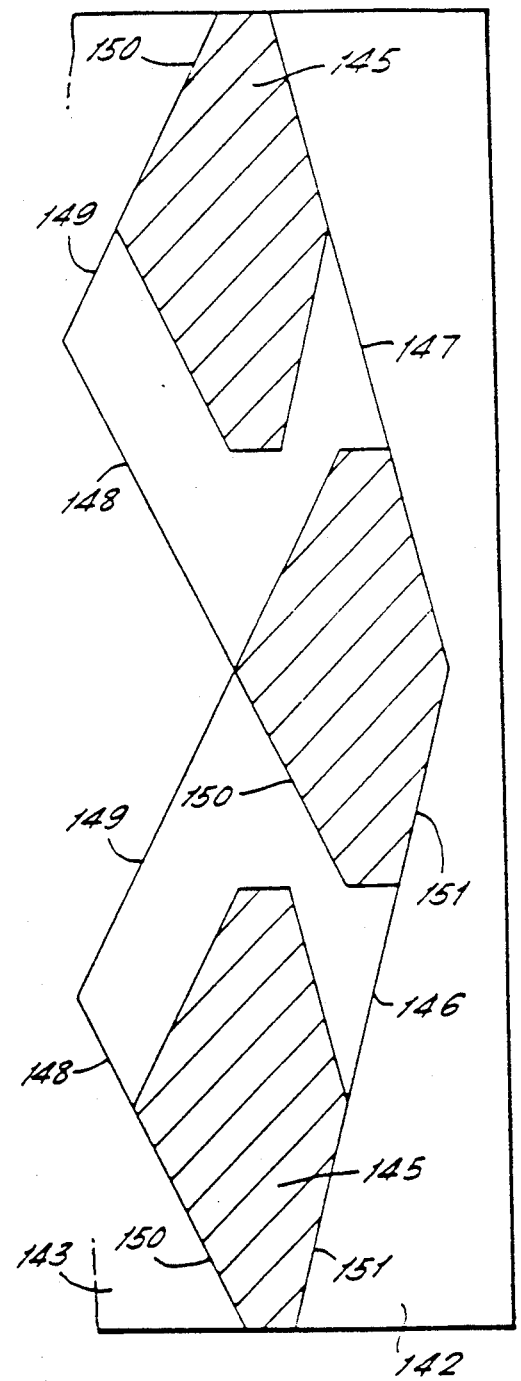

The basic components of the differential mechanism described above may also be embodied in a transfer differential and an example of a transfer differential mechanism is shown in FIGS. 14 and 15. The differential mechanism 140 comprises a cage 141, left hand and right hand face cam members 142, 143 and a set of cam followers 145. Comparing FIGS. 14 and 15 with the earlier embodiments of differential mechanism, it will be noted that each face cam member 142, 143 in differential mechanism 140 includes only a single set of cam surfaces and there is only a single set of cam followers 145. FIGS. 15a and 15b show a delineation of the cam surfaces and cam followers in two different positions.

Face cam member 142 includes two cam surfaces 146, 147, one being a left hand helical surface and the other a right hand helical surface, each of 180° arcuate length. Face cam member 143 includes four cam surfaces, a pair of left hand helical surfaces and a pair of right hand helical surfaces 148, 149. The arcuate extent of surfaces 148, 149 is 90°.

The cam followers 145 are again crescent shaped as has been described above but have an arcuate embrace in this instance of 120°. Each cam follower 145 has axially spaced cam followers surfaces 150, 151 each surface including left hand and right hand helical portions of 60°. The lead angles of the follower surface portions 151 are selected to match the lead angles of helical cam surfaces 146, 147 and the lead angles of follower surfaces 150 are selected to match the lead angles of the helical cam surfaces 148, 149. It will be appreciated that the provision of face cam members having two and four cam surfaces respectively and three cam followers provides a transfer differential 140 having a built in bias of the ratio 2:1. Other numbers of cam surfaces and cam followers may be employed in such a transfer differential and, in general, the numbers of cam surfaces on the two face cam members may differ by two, the number of cam followers employed being intermediate the numbers of cam surfaces on the two face cam members. Thus, if there are p cam surfaces on one face of the cam member and p+2 cam surfaces on the other cam member, p+1 cam followers will be employed. The cam followers will be all substantially identical but the lead angles of their helical follower surfaces will differ from one axial face to the other.

As can be seen in FIG. 14, the basic construction of the differential mechanism 140 is similar to the differential mechanisms described above. The face cam members are bearingly supported in end plates of the cage 141. Right hand face cam member 143 includes a hollow shaft 155 to which is fixed a sprocket 158 connected by a silent chain 156 to a second sprocket 157 to provide drive to one pair of wheels in a vehicle in which the transfer differential is used. The left hand face cam member 142 includes an integral shaft 159 extending through hollow shaft 155 to provide drive to the other pair of wheels of the vehicle. Input drive to the cage 141 is provided through a stub shaft 160 of an end plate of the cage remote from shafts 155, 159.

As has been described above, the differential mechanism 140 includes only a single set of cam followers and single sets of cam surfaces on face cam members 142, 143. It is not necessary to have inner and outer sets of cam followers and cam surfaces in this transfer differential since at all times there is always one cam follower in the forward drive condition and one in the reverse condition. Each cam follower recycles sequentially to its neighbour so that there is no need for an additional overlap, overlap between engagement of the followers being inherent in the device. This is illustrated in FIG. 15b.

It will be appreciated that a number of advantages stem from the differential mechanisms described above as compared with the prior art. The cam followers in the differential mechanisms described are always single acting and in compression. This greatly facilitates the taking up of backlash in the devices since backlash may be compensated by adjustment of the axial spacing of the components in one direction only and preloading of the components of the devices may also be effected simply by applying preloading forces in a single axial direction. Furthermore, the single acting cam followers and corresponding cam surfaces are always in sliding contact and thereby eliminate the meshing problems associated with many of the prior art devices.

FIGS. 16 to 20 show a further preferred embodiment of a differential mechanism and the following description is to be read in conjunction with the above description of FIGS. 1 to 15. The basic principles of operation and construction of the differential mechanism described below are exactly as described above.

Turning now to FIGS. 16 to 20, a differential mechanism 200 comprises the following main components—an input crown gear 211, a cage 212, left hand and right hand face cam members 213, 214 and a set of cam followers 215. Although the terms cam followers and face cams are used for consistency with the description above, the cam followers 215 may equally be referred to as racks and the face cams as worm members including a number of worms of opposite hand.

Left hand face cam member 213 comprises a central cylindrical boss 220 and an annular flange 221 which is provided with cam surfaces 223, 224. The face cam member 213 includes 24 cam surfaces 223 and 24 cam surfaces 224, one set of cam surfaces being essentially left hand thread worms and the other set being right hand thread worms. As can be seen best in FIG. 3, the cam surfaces 223, 224 are disposed alternately about the circumference of face cam member 213 and each cam surface occupies an arcuate portion of 1/48 of the circumference of the face cam member. The central boss 220 of the face cam member 213 is internally splined for fixing to a half shaft of a vehicle in which the differential mechanism is mounted.

Similarly, the right hand face cam member 214 comprises a central cylindrical boss 220 internally splined for fixing to a half shaft of a vehicle and an annular flange 221 on which cam surfaces 225, 226 are provided. Cam surfaces 225, 226 are again provided alternately around the circumference of face cam member 214 and comprise left hand thread worms and right hand thread worms. However, face cam member 214 includes 26 cam surfaces 225 and 26 cam surfaces 226. Each cam surface therefore represents an arcuate portion of 1/52 of the circumference of face cam member 214.

As seen best in FIG. 18, there are arranged between the two face cam members 213, 214, a set of cam followers 215 which are 25 in number. Each cam follower 215 comprises two generally similar cam follower components 230 which are axially aligned and abut. The detail of the cam follower components 230 is shown best in FIGS. 19 and 20. Each cam follower component comprises a generally rectangular body portion 231 having oil ways 232 formed on its larger side surfaces. A head portion 233 of the cam follower component 230 is integrally formed with the body portion and includes cam follower surfaces 228, the lead angles of which match the cam surfaces 223, 224 or 225, 226 respectively. It will be appreciated that although the cam follower components 230 are substantially identical in overall arrangement, the cam follower surfaces 228 formed on their head portions conform to the cam surfaces with which they are designed to cooperate.

Figure 16:
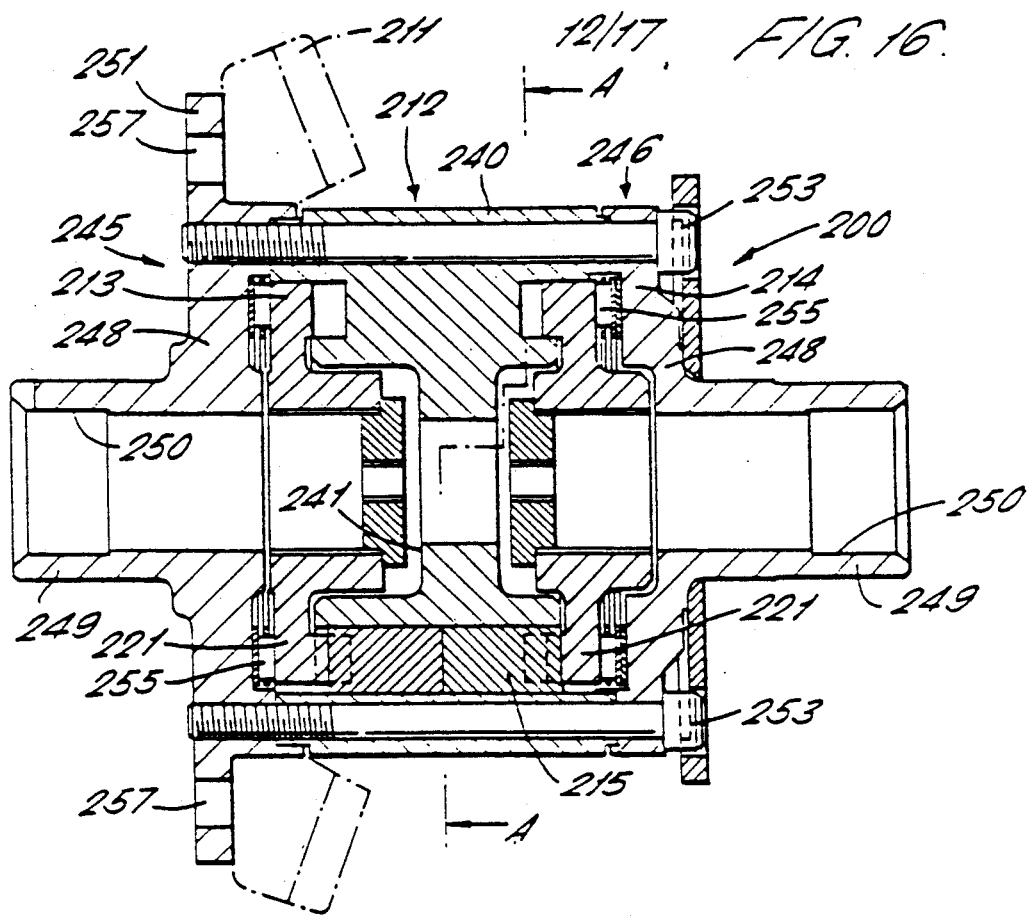
FIG. 16 is a longitudinal section through a further embodiment of a differential gear mechanism according to the invention with certain parts omitted and broken away for clarity.
Figure 17:
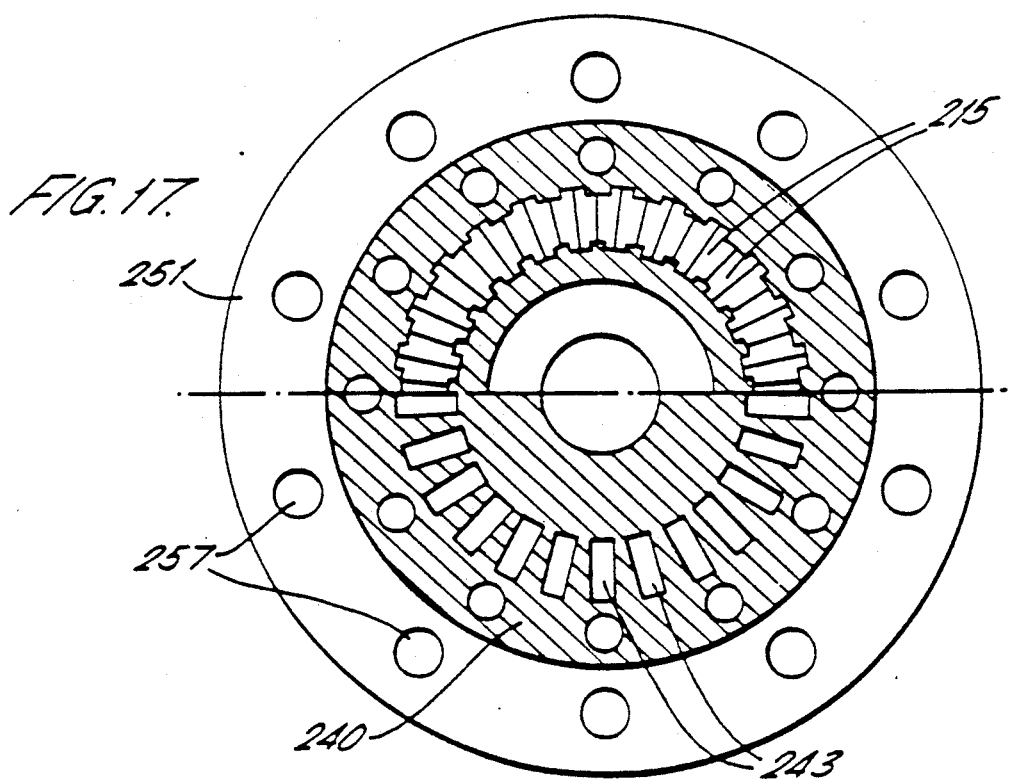
FIG. 17 is a section along the line A—A of FIG. 16.

The body portion 232 of cam follower components 230 are located in generally rectangular axial bores provided in a central portion 240 of the cage 212. As shown in FIG. 16 the central portion 240 of cage 212 is generally tubular and has a reduced thickness central portion 241. There are 25 axial bores 243 of rectangular cross-section and these are arranged equally angularly spaced around the outer part of portion 240.

The central portion 240 of cage 212 is fixed to left hand and right hand end portions 245, 246 of the cage. Each end portion 245, 246 includes an annular flange 248 through which bolts 253 are located to retain the end portions and central portion 240 of the case in assembled relation. A central cylindrical boss 249 extends axially outwardly from the flange 248 and includes a recess 250 for the location of a bearing in which the respective half shaft of the vehicle is rotatably mounted. The left hand end portion 245 of the cage 212 also includes an extended radial flange portion 251 to which the input crown gear 211 is fixed by bolts (not shown) passing through holes 257.

Reaction surfaces for the face cam members 213, 214 are provided between the axially outer faces of those face cam members and the axially inner faces of flange portions 248 of end portions 245, 246 of the cage 212. These reaction surfaces may take the form of friction pads or needle race bearings 255 as illustrated in FIG. 16. The operation of the differential mechanism 200 is exactly as described above particularly with reference to FIGS. 14 and 15 of the drawings of that specification. It will be appreciated that the major difference in differential mechanism 200 is the provision of a far greater number of cam followers 215 and corresponding cam surfaces on the face cam members 213, 214.

The provision of this far greater number of cam followers does have significant advantages. A major one of these is that the mass of each cam follower is significantly reduced as compared with earlier embodiments of the differential mechanism. The arrangement of the cam followers each comprising a pair of components also greatly simplifies manufacture and assembly of the differential mechanism.

As described above, friction reaction surfaces 85 are provided in the differential mechanism 10 between the outer ends of the face cam members 13, 14 and the end plates 23, 24 of the cage 12. As is also described above, these friction reaction surfaces may be provided at different radial distances from the axis of the face cam members, 13, 14 and, furthermore, the friction reaction surfaces may be replaced by needle race roller bearings in order to reduce the coefficient of friction between the face cam members and the end plates of the cage substantially to zero.

FIGS. 21 to 25 show further embodiments of differential mechanism incorporating a modification which provides further useful features.

Figure 25:
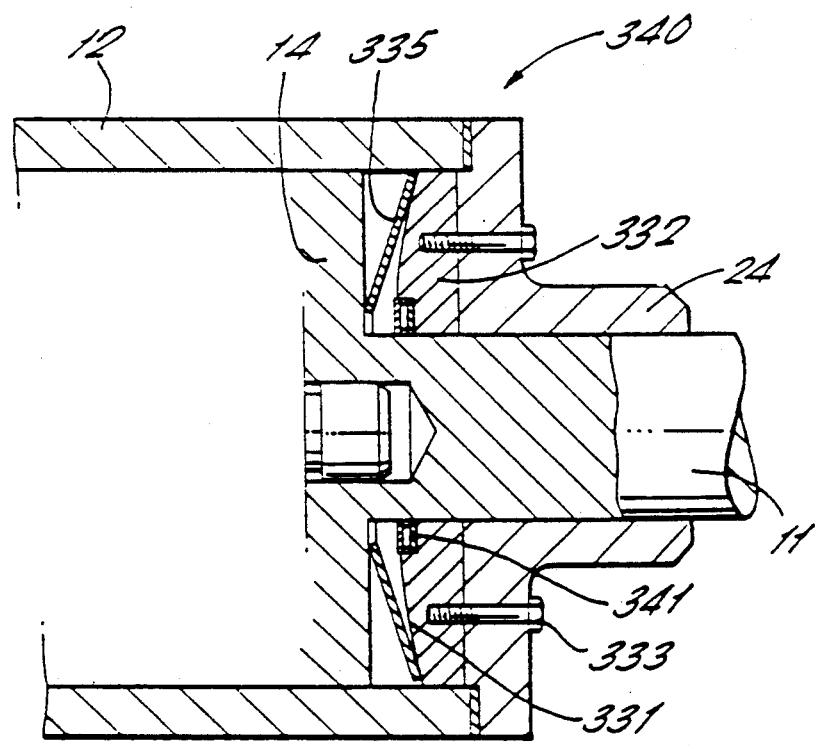
FIG. 25 is a view similar to FIG. 24 showing a modification to the embodiment of FIG. 24.

The basis of the modification is the provision of two or more friction reaction conditions for at least one of the face cams 13, 14 and means for switching automatically between those two or more conditions as the torque present in the differential mechanism increases. Two embodiments of differential mechanism having two friction reaction conditions are shown in FIGS. 21 and 22 and will now be described. Some further embodiments having infinitely variable friction reaction conditions between two limiting conditions are shown in FIGS. 23 to 25 and will be described below.

Referring first to FIG. 21, a differential mechanism 300 includes many parts identical to differential mechanism 10 and these are either not shown in FIG. 21 or are indicated by the same reference numerals. It will be observed that the annular plate 86 in differential mechanism 10 is not present in differential mechanism 300. In differential mechanism 300, a friction reaction surface 302 in the form of an annular bead is formed on the inner face of end plate 24 of the cage 12. A needle race roller bearing 303 is also provided on the inner face of end plate 24 radially outward of the reaction surface 302. As can be seen in FIG. 21, the bearing 303 extends axially from end plate 24 for a distance slightly greater than the reaction surface 302 so that the other face of the bearing 303 is slightly closer to the outer surface of face cam member 14.

A Belleville washer 305 is provided between the face cam member 14 and the end plate 24. The rest position of the Belleville washer 305 is as shown in FIG. 21. In this position, the Belleville washer acts between the face cam member 14 and the reaction surface 302 so that the effective friction reaction surface for the face cam member 14 is surface 302.

It will be appreciated that, as the torque in the differential mechanism 300 increases, there will be a tendency for the face cam member 14 to move outwardly towards the right as viewed in FIG. 21 This movement is restrained by the Belleville washer 305 but when the axial force generated by the torque exceeds a value determined by the Belleville washer 305, the Belleville washer will flex and will come into contact with the needle bearing 303. At this point, the reaction surface between the face cam member 14 and the end plate 24 will no longer be the reaction surface 302 and will instead be provided by the needle bearing 303. As described above, the friction reaction will then be reduced substantially to zero since the co-efficient of friction of the needle bearing 303 is very small. Thus, in the differential mechanism 300, a high torque ratio bias condition will be present when the torque in the device is relatively low and when the torque in the device exceeds a predetermined figure, as described above, the differential mechanism will switch automatically to the condition of low torque ratio bias provided by the needle bearing 303.

It will be appreciated that as the torque in the differential mechanism 300 again decreases, the situation described above will be reversed, the Belleville washer will return to the position shown in FIG. 21 and the high torque ratio bias condition provided by reaction surface 302 will again be present.

The initial spacing of the end plate 24 from the face cam member 14 is adjusted by shims 306 which serve to adjust the pressure on the Belleville washer 105 and thereby control the movement of the torque bias shift. It will be appreciated that the clearances around the Belleville washer are shown greatly exaggerated in FIG. 21 and the subsequent figures. The degree of flexing of the washer is in fact very small.

Turning now to FIG. 22, there is shown a differential mechanism 310 which provides automatic switching between two torque ratio bias conditions opposite to that described with reference to FIG. 21.

In differential mechanism 310, the face cam member 14 includes an outwardly directed annular circumferential bead 312 extending towards end plate 24 of cage 12. Located radially inwardly of annular bead 312 is a needle race roller bearing 313. A Belleville washer 315 is provided between the end plate 24 and the needle race roller bearing 313. As can be seen in FIG. 22, the rest position of the Belleville washer is such that the initial reaction between the face cam member 14 and the end plate 24 is provided by the needle bearing 313 through the Belleville washer 315. This will be a low torque bias ratio condition. As the torque in the differential mechanism 310 increases, the axial forces generated will urge face cam member 314 outwardly to the right as viewed in FIG. 22 and eventually overcome the resistance of the Belleville washer so that annular bead 312 engages end plate 24 of the case 12. At this point, the annular bead 312 will provide the friction reaction surface for the face cam member 14 and this will provide a high torque bias ratio condition. Again, as described above with FIG. 21, the torque level at which this happens will be determined by the Belleville washer 315. Furthermore, as the torque in the device decreases, the differential mechanism 310 will eventually revert to the condition shown in FIG. 22. The initial distance between the annular bead 312 and the end plate 24 and the initial flexing of the Belleville washer 315 may be adjusted by shims 316 interposed between the end plate 24 and central portion 20 of the case 12. Selection of shims 316 may be used to adjust the movement of the torque bias shift provided in the differential mechanism 310.

The present invention in so far as it relates to mechanisms with two friction reaction surfaces for one face cam member is not limited to the embodiments described above with reference to FIGS. 21 and 22. The arrangement shown in FIG. 21 or FIG. 22 may be provided at each end of a differential mechanism so that the friction reaction surfaces provided for face cam members 13 may be the same as provided for face cam members 14 and as shown in FIG. 21 or FIG. 22. However, in differential mechanisms intended for use as transfer differentials, the arrangement shown in FIG. 21 or FIG. 22 need not be duplicated at the other end of the differential mechanism which may instead be provided with a friction reaction surface 85 as shown above in FIG. 1 or with a needle race roller bearing as also described above. Transfer differentials of different built-in bias may therefore be provided by any combination of friction reaction surface, needle race roller bearing, and FIG. 21 or FIG. 22 arrangement.

Furthermore, the needle race bearings 103, 113 in FIGS. 21 and 22 may be replaced by further annular beads so that both friction reaction surfaces provide a positive friction force, at different radii, rather than one providing a substantially zero reaction force.

The differential mechanisms described above with reference to FIGS. 21 and 22 are suitable for use both in passenger cars and in heavier vehicles. The provision of automatic switching between two torque bias ratio conditions may have significant advantages in all sorts of applications. For example, in passenger cars, existing lockable or "non-slip" differential mechanisms provided with a high torque bias ratio might cause a "wagging" effect in a passenger car in which one was provided. In a situation where one wheel of the vehicle was tending to slip, the effect of the differential mechanism might be to provide increased torque to first one wheel and then the other as each wheel in turn tended to slip.

In heavier vehicles, a more significant advantage may stem from the arrangement just described. Prior art devices have been provided in which when one vehicle of a heavy goods vehicle was tending to slip, the torque ratio is increased to provide less torque to the spinning wheel and more torque to the wheel which is still gripping the road surface. Devices have achieved this, for example, by providing lock up in the differential mechanism. This might have the disadvantage that when both wheels again engaged the road surface, the sudden increase in torque on the half shaft attached to the wheel which had been slipping might provide a significant strain on the half shaft, possibly even to the extent of breaking a half shaft. In a differential mechanism where the locking of the differential mechanism is activated manually, it is almost impossible for an operator to react fast enough to the re-engagement of the wheel which has been slipping to avoid this problem. However, with the automatic shift between two torque ratio conditions described above, this problem would be overcome.

As mentioned above, FIGS. 23 to 25 show a further refinement in which the friction reaction surfaces are so arranged that infinite variation between limiting values of the torque arm radius of the friction reaction surface, and therefore bias, may be achieved.

In each of FIGS. 23 to 25, the differential mechanisms shown include many parts identical to differential mechanism 10 described above. These are either not shown in FIGS. 23 to 25 or are indicated by the same reference numerals. It will be appreciated that each of FIGS. 23 to 25 shows the right hand end (as viewed in FIG. 1) of the differential mechanism and, in particular, that portion of the right hand end within the cage 12, between right hand face cam member 14 and end plate 24 of the cage 12.

Referring first to FIG. 23, a differential mechanism 320 includes a friction reaction surface 321 positioned between the end face of face cam member 14 and end plate 24. The reaction surface 321 is provided on a friction reaction member 322 which surrounds output shaft 11 and is bolted to end plate 24 by bolts 323. The annular surface of the member 322 facing face cam member 14 is curved to provide the friction reaction surface 321. As shown in FIG. 23, the curve is such that the outer most edge of friction reaction surface 321 is parallel to face cam member 14 and closest to it. The distance between face cam member 14 and friction reaction surface 321 is greatest at the inner most portion of reaction surface 321.

A Belleville washer 325 is provided between the face cam member 14 and friction reaction surface 321. The rest position of the Belleville washer 325 is as shown in FIG. 23. In this position, the Belleville washer acts between face cam 14 and the innermost portion of the reaction surface 321 to provide a low torque bias condition of the differential mechanism 320.

It will be appreciated that, as the torque in differential mechanism 120 increases, there will be a tendency for the face cam member 14 to move outwardly towards the right as viewed in FIG. 23. As the axial force generated by the torque in the mechanism causes the Belleville washer to flex, the point of contact between the Belleville washer and the friction reaction surface 121 will move outwardly until, if sufficient axial force is present, the Belleville washer is acting between the face cam member 14 and the outer portion of friction reaction surface 321. This will produce a high torque bias condition.

Thus, in the differential mechanism 320, a low torque ratio bias condition will be present when the torque in the device is relatively low and the bias will increase as the torque increases to a limiting value determined by the condition described above when the Belleville washer acts between the face cam member 14 and the outermost portion of friction reaction surface 321.

The movement of the Belleville washer described above is, of course, reversed when the torque in the differential mechanism 320 again decreases until the Belleville washer and the associated components are again in the condition shown in FIG. 23.

The initial spacing of the end plate 24 from the face cam member 14 is adjusted by shims 326 which serve to adjust the preset pressure on the Belleville washer 325 when the mechanism is assembled.

Turning now to FIG. 24, there is shown a differential mechanism 330 which provides automatic and infinitely variable switching between two limit conditions opposite to that described with reference to FIG. 23. In FIG. 24, differential mechanism 330 includes a friction reaction member 332 which defines a curved friction reaction surface 331 closest to face cam member 14 at its inner most point and furthest away at its outermost point. The member 332 is fixed to end plate 24 by bolts 333.

A Belleville washer 335 is provided between the face cam member 14 and the end plate 24 and, in its rest position as shown in FIG. 24, acts between the face cam member 14 and the outer most portion of friction reaction surface 331. This provides the high bias condition for the differential mechanism 30.

As the torque in the device increases and the face cam member 14 tends to move outwardly towards the right as viewed in FIG. 24, the Belleville washer flexes and its point of contact with friction reaction surface 331 moves inwardly from the position shown in FIG. 24 until it reaches a limiting condition in which the Belleville washer is acting between the face cam member 14 and a portion of the friction reaction surface 331 adjacent to output shaft 11. This provides the low bias condition of the differential mechanism 330. When the torque in the differential mechanism again decreases, the axial force on the Belleville washer in turn, decreases and allows the Belleville washer to return from the condition described above to that shown in FIG. 24. It will be appreciated that the operation of the components in differential mechanism 330 is essentially the same as differential mechanism 320 described above but with the friction reaction surface 331 and Belleville washer arranged to diverge in the opposite direction so that the low torque condition of differential mechanism 330 is one of high bias and the high torque condition one of low bias.

It has been described above that a friction reaction surface may be replaced by a needle race roller bearing if it is desired to reduce the friction reaction substantially to zero under certain conditions. In the embodiments of FIGS. 23 and 24, such a needle race roller bearing may again be provided, inset into friction reaction members 322 or 332. FIG. 25 illustrates a differential mechanism 340 similar to differential mechanism 330 shown in FIG. 24 except that the radially innermost portion of friction reaction surface 331 in FIG. 25 is now formed by a needle race roller bearing 341. It will be appreciated that a similar bearing may also be incorporated into friction reaction member 322 in FIG. 23.

It will further be appreciated that the profile of friction reaction surfaces 321, 331 is not limited to that shown in FIGS. 23 and 24. The profile of these curved reaction surfaces may be selected to provide different bias variation characteristics in particular differential mechanisms. Generally, the friction reaction surface will be a domed surface with reference to the end plate 24 but the particular curve of the dome may be varied. The provision of the friction reaction surface on a separate friction reaction member 322, 332 which is bolted to end plate 14 greatly facilitates the provision of a range of different reaction surfaces and the ready interchangeability of those surfaces during assembly of the differential mechanism.

As discussed above with reference to 21 and 22 it will also be appreciated that the reaction surface arrangement shown in FIGS. 23 and 24 may be repeated at the left hand end of those differential mechanisms or some other friction reaction surface may be employed. In general, any combination of the arrangements shown in FIGS. 23 or 24 or those shown in FIGS. 21 and 22 or a fixed friction reaction surface 85 as shown in FIG. 1 or needle race roller bearing may be provided at the two ends of the differential mechanism in order to provide that differential mechanism with desired characteristics of torque bias. In particular, when a differential mechanism such as that shown in FIGS. 23 or 24 is intended for use as a transfer differential, reaction surface members with different curved profiles may be provided at the two ends of the differential mechanism in order to give desired and preselected characteristics to the front and rear axles of the vehicle in which the differential mechanism is incorporated.

The embodiments of FIGS. 21 to 25 have been described in the context of a differential mechanism as described with reference to FIGS. 1 to 20. However, the automatic shift between two friction reaction surfaces or an infinite range between two limits as described above may also be incorporated into other embodiments of differential mechanism, for example, those shown in U.S. Pat. No. 2,859,641, European Patent Application 0130806 or European Patent Application 0148641.

The invention is not limited to the embodiments described above and numerous modifications may be made within the scope of the invention. For example, the splines shown on the cages and cam followers of the various embodiments of differential mechanism need not necessarily be parallel sided splines. Tapered splines may be provided in order to create radially inward or outward forces between the various components. Dovetail section splines may also be employed.

In the embodiments described above, no specific mention has been made of lubricants for the differential mechanisms. These lubricants may be selected in order to improve the performance of the differentials. Generally, the mechanisms will be lubricated with mineral oils of known type contained within the housings of the differentials. In the embodiments illustrated, the face cams and cam followers will then be lubricated by the same mineral oil.

However, it is known that the irreversibility of driving engagement between the cams and cam followers is dependant on the coefficient of friction between them. In order to increase the effective coefficient of friction between the cam surfaces and cam followers, a silicon base lubricant may be used for these components. It will be appreciated that if such lubricant is used, then means must be provided to separate this lubricant from the usual mineral oil lubricant of the final drive of the vehicle in which the differential is mounted. Appropriate sealing arrangements may be introduced into the embodiments described above. The differential mechanism have been described with reference to their use in motor land vehicles. However, their use is not limited to such vehicles. For example, the mechanisms may be used in winches having two drives to take up two cables. In such winches it is necessary to provide a torque divider as well as the speed divider and the differential mechanisms described above provide this feature.

I claim:

1. In a differential mechanism comprising an input, a cage connected to the input, two outputs, a face cam member connected to each of said outputs, said face cam members being arranged co-axially and each comprising at least two axially directed helical cam surface portions, said portions being of opposite hand, and at least one layer of cam followers, each layer containing at least two cam followers, the or each cam follower being slidably mounted in the cage and including two axially spaced helical cam follower portions of opposite hands for mating abutment against said corresponding ones of said face cam surface portions whereby relative contra rotation of said outputs drives each cam follower to slide axially in said cage, the improvement wherein the cam followers in each layer are arranged in juxtaposed circumferential sets with no substantial circumferential gap between adjacent cam follower surfaces, and in that the cam followers are captured rotationally in the cage with only one degree of freedom for sliding movement in the direction of the axis.

2. A differential mechanism as claimed in claim 1 in which the lead angles of the helical cam surface portions are selected such that their tangent is less than the coefficient of friction between the mating surfaces of the face cam members and cam followers so that driving movement between each cam follower portion and its respective face cam surface portion is substantially irreversible.

3. A differential mechanism as claim in claim 1 in which each face cam member comprises at least one set of cam surface portions, one left hand helix and one right hand helix linked to form a continuous cam surface.

4. A differential mechanism as claimed in any one of claims 1 to 3 in which continued relative contra-rotation of the outputs causes each cam follower to reciprocate between limits of axial movement.

5. A differential mechanism as claimed in any one of claims 1 to 3 in which the or each of the said cam followers is single acting and is maintained in compression by its interaction with the face cam members.

6. A differential mechanism as claimed in claim 5 in which means are provided for adjusting the axial spacing of the face cam members thereby to take up backlash in the differential mechanism.

7. A differential mechanism as claimed in any one of claims 1 to 3 in which the axially spaced cam follower portions of each cam follower each comprise two helical portions of opposite hand, in use, one said portion cooperating with its respective face cam surface portion in forward motion condition and the other in overrun or reverse conditions.

8. A differential mechanism as claimed in claim 7 in which the axially spaced cam follower portions of each cam follower of each pair are equally divided into left and right hand helical portions and each cam follower has an arcuate embrace of approximately 180°.

9. A differential mechanism as claimed in claim 8 in which said equal helical portions of each cam follower are arranged with the left and right hand helix portions diverging towards the arcuate centre of the cam follower and converging towards its arcuate ends to provide a cam follower which is generally crescent shaped.

10. A differential mechanism as claimed in any one of claims 1-3 in which each set of cam surface portions extends around the full 360° circumference of its face cam member and comprises a right hand helix portion and a left hand helix portion, each of 180° arcuate length.

11. A differential mechanism as claimed in any one of claims 1-3 in which the lead angles of the helical cam surface portions are such that the or each cam follower may partially backdrive at least one of the face cam members depending on the magnitude of the torque exerted on the outputs.

12. A differential mechanism as claimed in any one of claims 1-3 in which there are n cam followers in each set, each cam follower having an arcuate embrace of 360/n degrees and including equal left and right hand helical portions of 180/n degrees of each of said axially spaced cam follower portions.

13. A differential mechanism as claimed in claim 1 in which the cage comprises a central tubular portion and end plates closing off each end of the tubular portion, means being provided for varying the axial spacing of the end plates, in order to take up backlash between the face cam members and the cam followers.

14. A differential mechanism as claimed in claim 13 in which the cage further comprises an annular flange, an input gear for the mechanism being fixed to the flange.

15. A differential mechanism as claimed in claim 13 in which each face cam member comprises a generally circular plate having axially extending annular portions defining said cam surface portions.

16. A differential mechanism as claimed in claim 15 in which each face cam member further comprises an output shaft co-axial with the plate and integrally formed therewith, said shafts being bearingly supported in the end plates of the cage and extending therethrough.

17. A differential mechanism as claimed in claim 1 or claim 2 further comprising friction reaction surfaces provided between each face cam member and the cage.

18. A differential mechanism as claimed in claim 17 in which the reaction surfaces comprise axial projections of discs members fixed to the face cam members adjacent the end plates of the cage so that said projections frictionally engage said end plates.

19. A differential mechanism as claimed in claim 18 in which said projections are annular beads, the radius of said beads being preselected to provide a chosen torque arm radius for the reaction surfaces.

20. A differential mechanism as claimed in claim 1 in which one of said face cam members has p cam surface portions and the other of said face cam members has P+2 cam surface portions, and in which there are P+1 cam followers, each cam follower including two axially spaced helical cam follower portions the lead angles of which match their respective abutting cam surface portions.

21. A differential mechanism as claimed in claim 20 for use as a transfer differential and having a built-in bias between the outputs of a ratio of 2:1 in which a first face cam member fixed to one of the outputs has one left hand and one right hand helical cam surface portion of 180 degrees each, a second face cam member fixed to the other of said outputs has two sets of left and right hand helical cam surface portions of 90 degrees each and there are three cam followers each of which has an arcuate embrace of approximately 120 degrees, the axially spaced helical cam follower portions of each cam follower each comprising equal portions of left and right hand helix whose lead angles match the cam surface portions which they abut.

22. A differential mechanism as claimed in claim 1 characterized in that friction reaction surfaces are provided acting between each face cam member and the cage, at least one face cam member having one or more friction reaction members associated therewith providing at least two friction reaction surfaces at different distances from the axis of the face cam members, and means are provided for engaging said face cam member with first one and then the other or other of said surfaces in response to changes in torque in the differential mechanism.

23. A differential mechanism as claimed in claim 22 in which one of said friction surfaces comprises a fixed friction member and the other comprises a bearing.

24. A differential mechanism as claimed in claim 23 in which said bearing is a needle roller bearing.

25. A differential mechanism as claimed in claim 22 in which engaging means comprises a resilient member engaging in a first position one of said surfaces and movable when the torque in the mechanism exceeds a predetermined value to a second position in which said other surface is engaged.

26. A differential mechanism as claimed in claim 25 in which said one surface is a fixed reaction surface and said other surface is a bearing.

27. A differential mechanism as claimed in claim 25 in which said one surface is a bearing and said other surface is a fixed reaction surface.

28. A differential mechanism as claimed in claim 25 in which said friction reaction member comprises an annular member having one face radially curved to provide an infinite number of reaction surfaces between inner and outer limits.

29. A differential mechanism as claimed in claim 28 in which the curved profile of said annular member is shaped to provide a predetermined characteristic for the differential mechanism.

30. A differential mechanism as claimed in claim 28 in which one of the inner or outer limit reaction surfaces of the annular member comprises a bearing.

31. A differential mechanism as claimed in claim 28 in which each face cam member has an annular friction reaction member associated therewith, the curved profiles of the annular members being different.

32. A differential mechanism as claimed in claim 29 in which said engaging means comprises a resiliently flexible member which engages said annular members in a first position at either said inner or outer limit and, in response to increasing torque in the differential mechanism, engages said annular members in a multiplicity of other positions between said limits.

33. A differential mechanism as claimed in claim 25 in which said resilient member is a Belleville washer.

34. A differential mechanism as claimed in claim 25 further comprising a cage to which the input is provided and in which the friction reaction member or members are provided between the face cam members and end plates of the cage.

35. A differential mechanism as claimed in claim 34 further comprising a cage to which the input is provided and in which the friction reaction member or members are provided between the face cam members and end plates of the cage, and in which said fixed reaction surface comprises an annular bead formed on an end plate of the cage and said bearing is carried by said end plate.

36. A differential mechanism as claimed in claim 27 further comprising a cage to which the input is provided and in which the friction reaction member or members are provided between the face cam members and end plates of the cage, and said bearing is carried by the face cam member and said fixed reaction surface is an axially extending projection of said face cam member.

37. A differential mechanism as claimed in claim 28 further comprising a cage to which the input is provided and in which the friction reaction member or members are provided between the face cam members and end plates of the cage, and said annular member, is fixed to an end plate of the cage.

* * * * *